(12) United States Patent
Hayashi

(10) Patent No.: US 7,287,284 B2
(45) Date of Patent: Oct. 23, 2007

(54) INFORMATION PROCESSING METHOD AND APPARATUS, AND COMPUTER PROGRAM AND COMPUTER-READABLE STORAGE MEDIUM

(76) Inventor: Junichi Hayashi, c/o Canon Kabushiki Kaisha, 3-30-2, Shimomaruko, Ohta-ku, Tokyo (JP)

( * ) Notice: Subject to any disclaimer, the term of this patent is extended or adjusted under 35 U.S.C. 154(b) by 774 days.

(21) Appl. No.: 10/419,840

(22) Filed: Apr. 22, 2003

(65) Prior Publication Data

US 2003/0204812 A1    Oct. 30, 2003

(30) Foreign Application Priority Data

Apr. 24, 2002  (JP) ............................. 2002-122601
Mar. 10, 2003  (JP) ............................. 2003-064040

(51) Int. Cl.
*G06F 7/04* (2006.01)
*H04L 9/00* (2006.01)

(52) U.S. Cl. ........................... 726/32; 726/26; 713/176

(58) Field of Classification Search ........ 713/176–189; 726/32, 26

See application file for complete search history.

(56) References Cited

U.S. PATENT DOCUMENTS

| | | | |
|---|---|---|---|
| 5,467,169 A * | 11/1995 | Morikawa .................... | 399/366 |
| 6,233,347 B1 * | 5/2001 | Chen et al. .................. | 382/100 |
| 6,334,187 B1 * | 12/2001 | Kadono ....................... | 713/176 |
| 6,396,937 B2 * | 5/2002 | Chen et al. .................. | 382/100 |
| 6,400,826 B1 * | 6/2002 | Chen et al. .................. | 382/100 |
| 6,535,616 B1 | 3/2003 | Hayashi et al. | |
| 6,636,615 B1 * | 10/2003 | Rhoads et al. .............. | 382/100 |
| 6,785,814 B1 * | 8/2004 | Usami et al. ................ | 713/176 |
| 6,804,779 B1 * | 10/2004 | Carroni et al. .............. | 713/176 |
| 6,807,285 B1 * | 10/2004 | Iwamura ...................... | 382/100 |
| 7,027,179 B2 * | 4/2006 | Mori ........................... | 358/1.18 |
| 2001/0055390 A1 | 12/2001 | Hayashi et al. | |
| 2002/0172398 A1 | 11/2002 | Hayashi | |
| 2002/0176116 A1 * | 11/2002 | Rhoads et al. .............. | 358/405 |
| 2002/0199106 A1 | 12/2002 | Hayashi | |
| 2003/0059086 A1 | 3/2003 | Hayashi | |
| 2005/0129270 A1 * | 6/2005 | Prakash ....................... | 382/100 |

FOREIGN PATENT DOCUMENTS

JP     2614369     2/1997

* cited by examiner

*Primary Examiner*—Nasser Moazzami
*Assistant Examiner*—Mohammad Reza

(57) ABSTRACT

Additional information is embedded in document data by inputting document data, inputting additional information, and inputting image data. The additional information is embedded in the input image data using a first digital watermark method, and the additional information is embedded in the input document data using a second digital watermark method. The document data embedded with the additional information is composited with the image data embedded with the additional information, with the image data as a background image. In a case where an original document containing information embedded using the second digital watermark method is copied by a copying machine, the information embedded in the copied document cannot be detected. The first digital watermark method has a robustness such that, when an original document containing information embedded using the first digital watermark method is copied by a copying machine, information embedded in the copied document can be detected.

7 Claims, 32 Drawing Sheets

801

802

803

804

| 0.7 | 0.7 | −0.6 | −0.6 |
| --- | --- | --- | --- |
| −0.7 | −0.7 | 0.6 | 0.6 |
| 0.9 | −0.9 | −0.8 | −0.8 |
| −0.9 | −0.9 | 0.8 | 0.8 |

$$I'_{ij} = I_{ij} + a \cdot W_{ij}$$

(matrices 1001 = 1002 + a* 1003)

FIG. 14 w1 (1401)

| 0.7 | 0 | 0 | -0.6 |
|---|---|---|---|
| 0 | 0 | 0 | 0 |
| 0 | 0 | 0 | 0 |
| 0 | -0.9 | 0.8 | 0 | w2 (1402)

| 0 | 0 | 0 | 0 |
|---|---|---|---|
| 0 | 0.7 | -0.6 | 0 |
| -0.9 | 0 | 0 | 0.8 |
| 0 | 1 | 1 | 0 | w3 (1403)

| 0 | 0 | 0 | 0 |
|---|---|---|---|
| 0.7 | 0 | 0 | -0.6 |
| 0 | 0 | 0 | 0 |
| 0 | -0.9 | 0.8 | 0 | w4 (1404)

| 0 | 0.7 | -0.6 | 0 |
|---|---|---|---|
| 0 | 0 | 0 | 0 |
| 0 | 0 | 0 | 0 |
| -0.9 | 0 | 0 | 0.8 |

F I G. 22
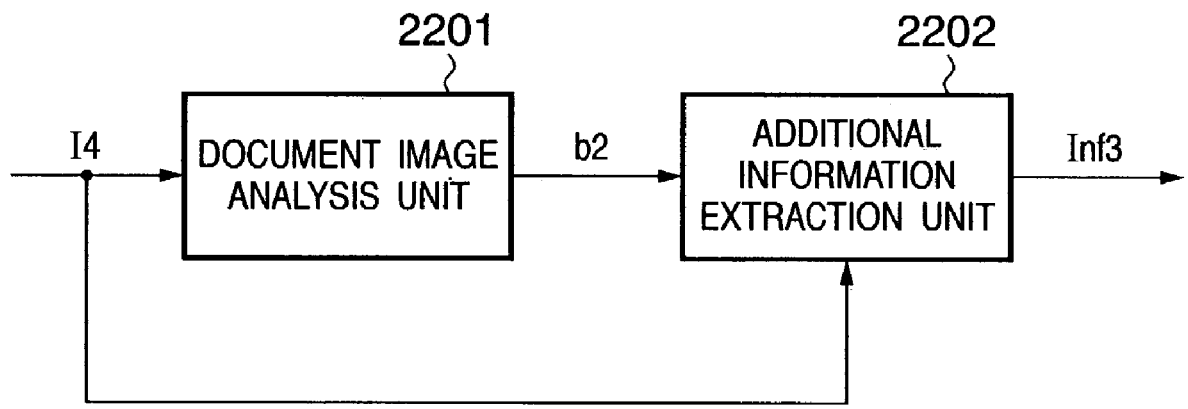

INFORMATION PROCESSING METHOD AND APPARATUS, AND COMPUTER PROGRAM AND COMPUTER-READABLE STORAGE MEDIUM

FIELD OF THE INVENTION

The present invention relates to a method and apparatus for verifying the relationship between given document data and a master (original), and a computer program and computer-readable storage medium.

BACKGROUND OF THE INVENTION.

In recent years, the quality of images formed by digital image forming apparatuses such as a printer, copying machine, and the like has remarkably improved, and high-quality prints can be easily acquired. That is, any one can obtain required prints by image processes using a high-performance scanner, printer, copying machine, and computer. Furthermore, recent high-performance copying machines pose a problem of illicit copies of documents generated in this way, and a security technique required to prevent, suppress, or trace them has increasingly gained its importance.

For example, in a method proposed by Japanese Patent No. 2,614,369, upon outputting a document using a copying machine, printer, or the like, identification information unique to the copying machine or printer used to output is appended to the document using a color agent which is imperceptible to the human eye, and the document is then output. When the document output in this way is copied later, the appended identification information unique to the copying machine or printer is read from the copied document and is analyzed, thus specifying the copying machine and printer used to output the document.

As described above, it is possible in the prior art to specify the copying machine and printer used to output the document, and to trace illicit copies. However, it is difficult in the prior art to verify if the document is an original.

SUMMARY OF THE INVENTION

The present invention has been made in consideration of the above situation, and has as its object to provide an information processing method and apparatus, which embed a plurality of types of different information, verify and check each embedded information, and verify if target document data corresponds to an original or copy, and a computer program and computer-readable storage medium.

According to an aspect of the present invention, the foregoing object is attached by providing an information processing method for embedding additional information in document data, comprising:

a document data input step of inputting document data;

an additional information input step of inputting additional information;

an image input step of inputting a predetermined image;

a first embedding step of embedding the additional information in the input image;

a second embedding step of embedding the additional information in the input document data; and a composition step of compositing the embedding results in the first and second embedding steps.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 shows an example of a first digital watermark embedding arithmetic operation in the first embodiment;

FIG. 14 shows an example of extraction patterns in the first embodiment;

FIG. 22 is a block diagram for explaining a second digital watermark extraction process in the second embodiment;

DETAILED DESCRIPTION OF THE PREFERRED EMBODIMENTS

Preferred embodiments of the present invention will be described in detail hereinafter with reference to the accompanying drawings.

Prior to a detailed description, in embodiments to be described hereinafter, the first embodiment explains principal features, and other embodiments are modifications of the first embodiment or examples obtained by adding other functions to the first embodiment.

First Embodiment

Figure 3:
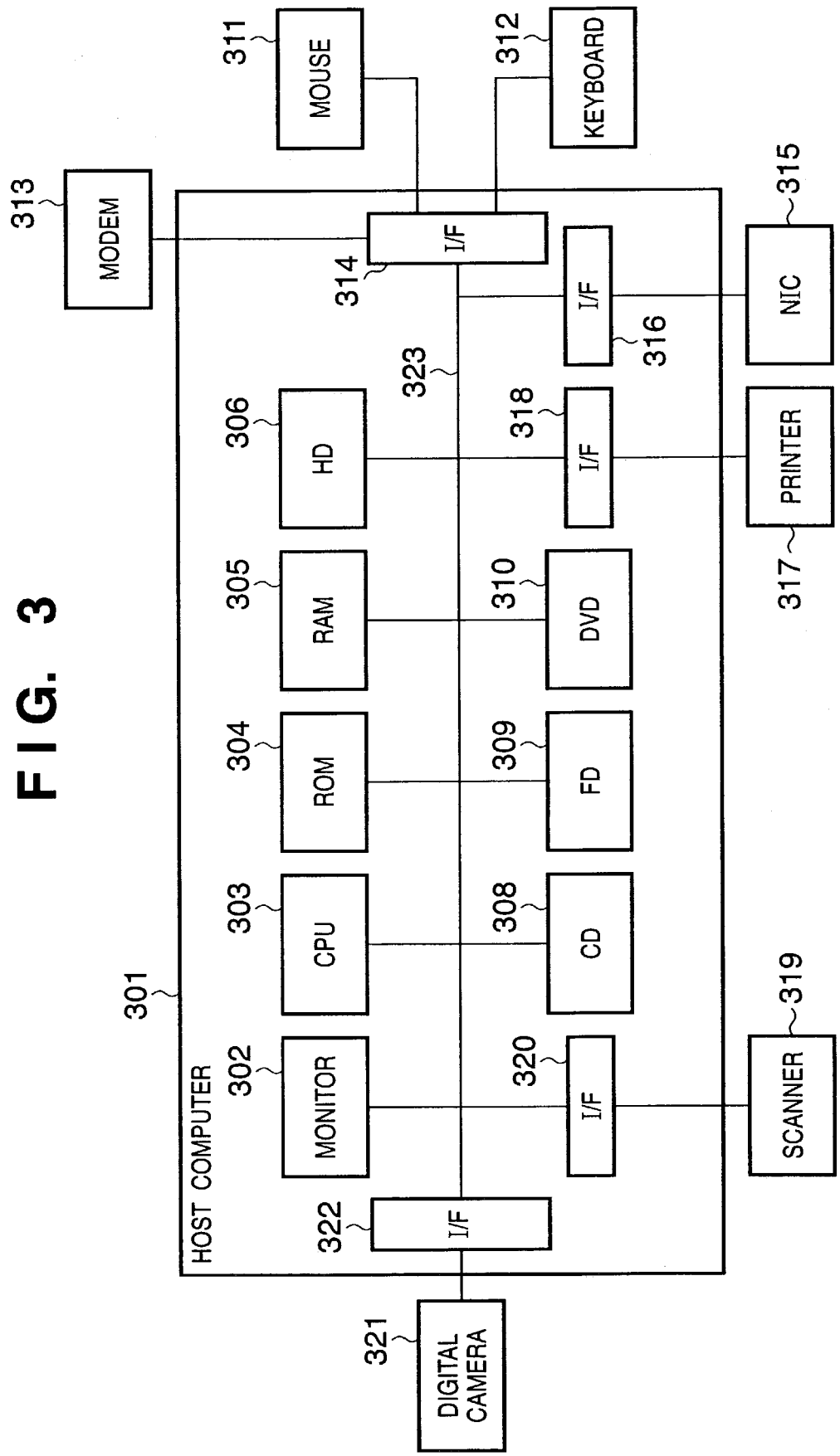
FIG. 3 is a block diagram showing the arrangement of an information processing apparatus in the first embodiment.

FIG. 3 shows the overall arrangement of an image processing apparatus which can be applied to this embodiment. Referring to FIG. 3, a host computer 301 is, e.g., a generally prevalent personal computer, which can receive an image scanned by a scanner 319, and can edit and save that image. Likewise, the host computer 301 can receive an image sensed using a digital camera 321, and can edit and save that image. Furthermore, the image obtained by the host computer 301 can be printed by a printer 317. Various user's manual instructions are issued based on inputs from a mouse 311 and keyboard 312. Moreover, the host computer 301 can exchange various data with another computer using a modem 313 and NIC (Network Interface Card) 315.

In the host computer 301, respective blocks to be described later are connected via a bus 323 to be able to exchange various data with each other.

Referring to FIG. 3, reference numeral 302 denotes a monitor which can display various kinds of information from the host computer.

Reference numeral 303 denotes a CPU, which controls the operations of internal blocks, or can execute an internally stored program. Reference numeral 304 denotes a ROM, which stores a BIOS and a boot program. Reference numeral 305 denotes a RAM which temporarily stores a program and image data to be processed so as to execute processes by the CPU 303. An OS and programs required to implement various processes described in the embodiment are loaded onto the RAM 305.

Reference numeral 306 denotes a hard disk (HD) which stores the OS and programs to be transferred to the RAM or the like, and is used to store and read out image data during the operation of the apparatus. Reference numeral 308 denotes a CD drive which can read out or write data from or in a CD (CD-R) as one of external storage media. Reference numeral 309 denotes an FD drive which can read out or write data from or in an FD as in the CD drive 308. Reference numeral 310 denotes a DVD drive 810 which can read out or write data from or in a DVD as in the CD drive 308. If the CD, FD, DVD, or the like stores an image edit program, such program is installed on the HD 306 and is transferred to the RAM 305 as needed.

Reference numeral 314 denotes an interface (I/F), which is used to accept input instructions from the pointing device (mouse (R) or the like) 311 and keyboard 312, and to exchange data with another computer via the modem 313. For this purpose, the I/F 314 is connected to these devices.

Reference numeral 316 denotes an interface (I/F) which is used to exchange various data stored in the HD 306, CD 308, FD 309, DVD 310, and the like with another computer via the NIC 315. For this purpose, the I/F 316 is connected to these devices.

Reference numeral 318 denotes a printer interface (I/F) which is used to output image data and text data stored in the HD 306, CD 308, FD 309, DVD 310, and the like onto media such as paper sheets via the printer 317. For this purpose, the I/F 318 is connected to these devices.

Reference numeral 320 denotes an interface (I/F) which is used to accept image data input from the scanner 319, and to store the image data in the HD 306 and RAM 305. For this purpose, the I/F 320 is connected to these devices.

Reference numeral 322 denotes an interface (I/F) used to accept image data sensed using the digital camera 321, and to store the image data in the HD 306 and RAM 305. For this purpose, the I/F 322 is connected to these devices.

[Signature Processor]

A signature processor (function) which is applied to this embodiment will be explained below using FIG. 1. In the following description, assume that the power supply of the host computer 301 has been turned on, the OS has been loaded onto the RAM 305, and applications required to implement processes to be described in this embodiment have been loaded onto the RAM 305. Hence, respective processors are implemented by the corresponding programs and CPU 303 which executes them, and peripheral hardware in some cases.

Figure 1:
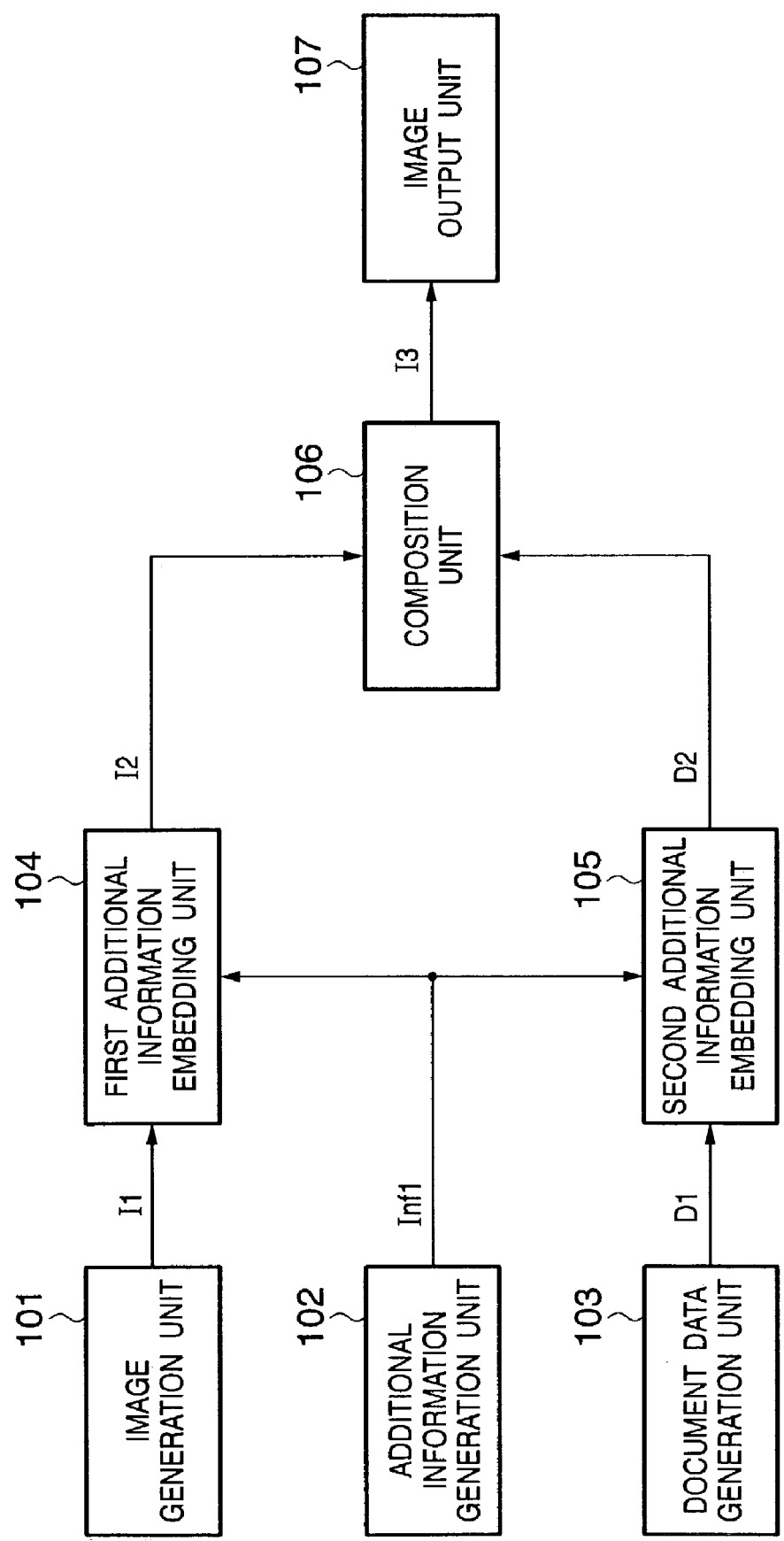
FIG. 1 is a block diagram showing the arrangement of a signature processor in the first embodiment of the present invention.

As shown in FIG. 1, the signature processor in this embodiment comprises an image generation unit 101, additional information generation unit 102, document data generation unit 103, first additional information embedding unit 104, second additional information embedding unit 105, composition unit 106, and image output unit 107.

Note that the signature process to be described below may be implemented by software processes. In such case, the aforementioned units should be considered as conceptual functions required for the process.

The function of the image generation unit 101 will be described first. The image generation unit 101 generates image data I1 to be set as the background of document data to be described later. Generated image data I1 is input to the first additional information embedding unit 104.

In the following description, image data I1 expresses a multi-valued monochrome image for the sake of simplicity. However, the present invention is not limited to such specific case, and arbitrary images such as a full-color image and the like can be applied.

In order to generate image data I1, the image generation unit 101 can use various means. For example, the generation unit 101 can read out and use image data pre-stored in the ROM 304, RAM 305, HD 306, CD 308, FD 309, DVD 310, and the like in FIG. 3, can use image data received via a network using the NIC 315 and the like, or can use digital data obtained by digitizing a document printed on a paper sheet using the scanner 319, digital camera 321, or the like. Image data I1 generated by the image generation unit 101 is temporarily held by the RAM 305.

The function of the additional information generation unit 102 will be explained below. The additional information generation unit 102 generates additional information Inf1 to be appended to image data I1 or document data D1 in the first and second additional information embedding units 104 and 105 to be described later. Generated additional information Inf1 is temporarily held by the RAM 305.

As additional information Inf1, information unique to an output device, information associated with an output date, information output with an output person, and the like, and combinations of these pieces of information may be set. As means for generating additional information Inf1, information pre-stored in the ROM 304 or RAM 305, information received from a network using the modem 113 and NIC 315, information input by the user using the mouse 311, keyboard 312, or the like may be used.

Note that generated identification information Inf1 may be encrypted not to be readily misused. And/or identification information Inf1 may undergo error correction encoding so as to correctly extract identification information Inf1, even when an ill-disposed person has changed the contents of image data I2 in which identification information Inf1 is embedded as a digital watermark to be described later (to be referred to as attack hereinafter) so that information Inf1 can no longer be extracted from image data I2. Identification information Inf1 output in this way is temporarily held by the RAM 305.

The function of the document data generation unit 103 will be explained below. The document data generation unit 103 generates document data D1 to be signed by the signature processor of this embodiment. Generated document data D1 is input to the second additional information embedding unit 105.

In the following description, document data D1 expresses a binary image of a document (black text on a white background) for the sake of simplicity. However, the present invention is not limited to such specific case, and a multi-valued image and full-color image can be used. When non-image data such as PDF data or the like is generated as document data D1, it can be converted into image data before processes.

As means for generating document data in the document data generation unit 103, the same means as those for the image generation unit 101 mentioned above can be applied. Document data D1 generated by the document data generation unit 103 is temporarily held by the RAM 305.

The function of the first additional information embedding unit 104 will be explained below. The first additional information embedding unit 104 receives image data I1 generated by the image generation unit 101, and additional information Inf1 generated by the additional information generation unit 102 from the RAM 305. The unit 104 embeds input additional-information Inf1 in image data I1 as a digital watermark, and outputs it as image data I2.

Note that a digital watermark embedding method used in the first additional information embedding process embeds a digital watermark which has relatively weak robustness against attacks, and is destroyed or erased when image data embedded with that digital watermark is copied. Details of the first digital watermark embedding method will be described later. Image data I2 embedded with additional information Inf1 is temporarily held by the RAM 305.

The function of the second additional information embedding unit 105 will be explained below. The second additional information embedding unit 105 receives document data D1 generated by the document data generation unit 103, and additional information Inf1 generated by the additional information generation unit 102 from the RAM 305, embeds input additional information Inf1 in document data D1 as a digital watermark, and outputs the result as document data D1.

Note that a digital watermark embedding method used in the second additional information embedding process embeds a digital watermark which has relatively strong robustness against attacks, and remains and can be normally extracted even when image data embedded with that digital watermark is copied. Details of the second digital watermark embedding method will be described later. Document data D2 embedded with additional information Inf1 is temporarily held by the RAM 305.

The function of the composition unit 106 will be explained below. The composition unit 106 receives image data I2 embedded with additional information Inf1 by the first additional information embedding unit 104, and document data D2 embedded with additional information Inf1 by the second additional information embedding unit 105 from the RAM 305, composites image data I2 and document data D2, and outputs the result as data I3.

Figure 4:
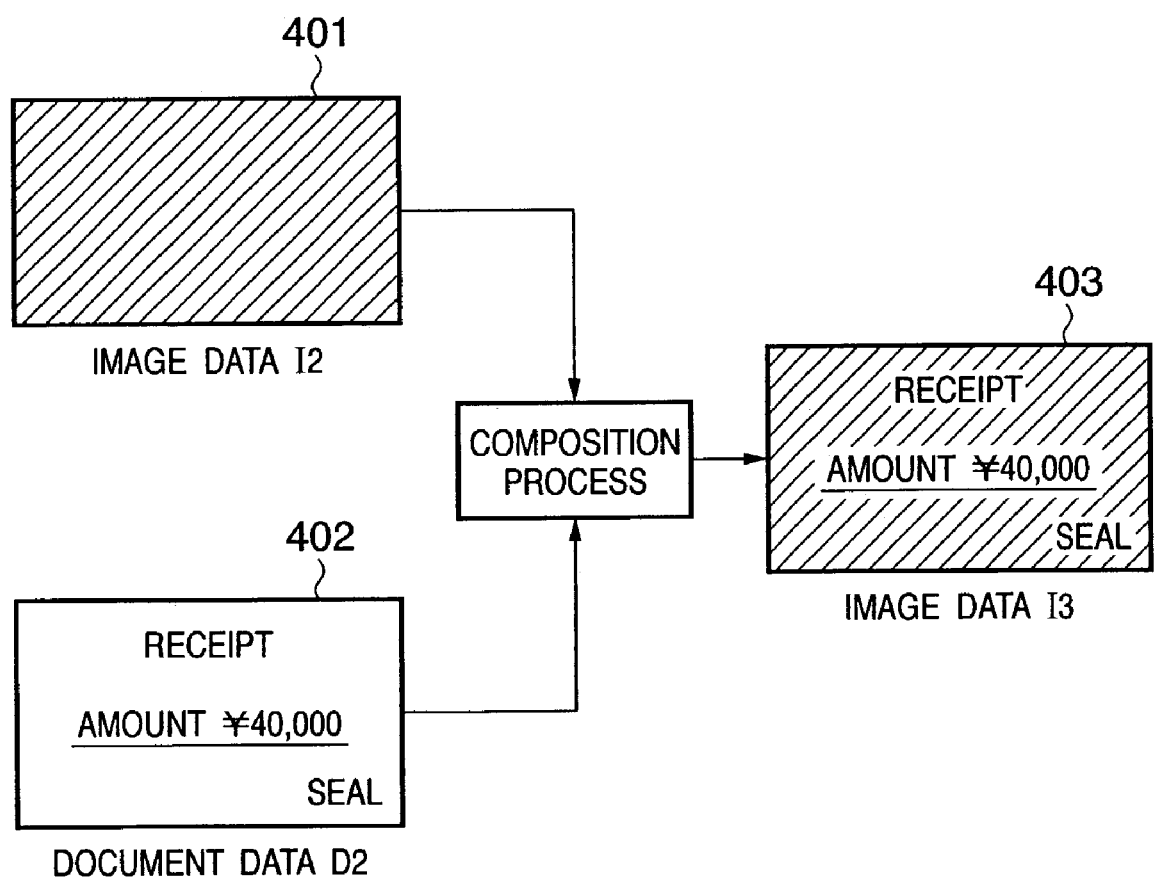
FIG. 4 is a view for explaining a composition processor in the first embodiment.

An example of the process to be implemented by the composition unit 106 will be described below using FIG. 4. Referring to FIG. 4, reference numeral 401 denotes image data I2 input to the composition unit 106; 402, document data D2 input to the composition unit 106; and 403, image data I3 obtained by compositing the image data 401 and document data 402 by the composition unit 106. As shown in FIG. 4, image data I2 is composited to be superposed on document data D2, as its background. Image data I3 composited in this way is temporarily held by the RAM 305.

The function of the image output unit 107 will be described below. The image output unit 107 receives image data I3 composited by the composition unit 106 from the RAM 305, and outputs input image data I3.

Means for outputting image data I3 can include various means. For example, image data may be recorded on the RAM 305, HD 306, CD 308 (in case of a CD-R or CD-RW), FD 309, DVD 310 (in case of a DVD-RAM, DVD-R, or the like), or the like in FIG. 3, may be sent via a network using the modem 313, NIC 315, and the like, or may be printed on a paper sheet using the printer 317 and the like.

The signature processor in this embodiment has been explained.

[Verification Processor]

A verification processor (function) which is applied to this embodiment will be described below using FIG. 2.

Figure 2:
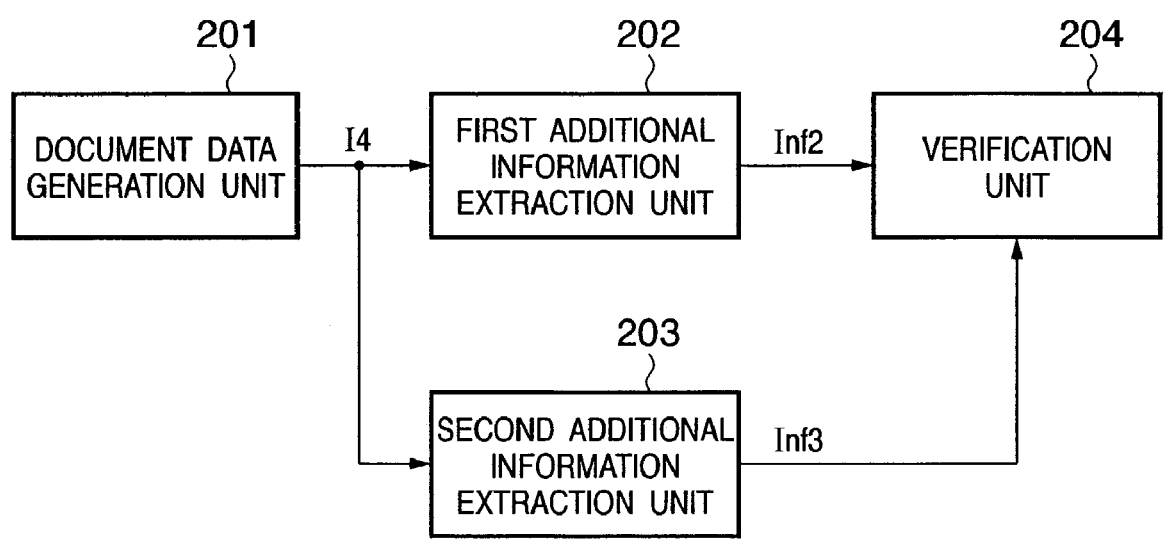
FIG. 2 is a block diagram showing the arrangement of a verification processor in the first embodiment.

As shown in FIG. 2, the verification processor of this embodiment comprises a document data generation unit 201, first additional information extraction unit 202, second additional information extraction unit 203, and verification unit 204.

Note that the verification process to be described below may be implemented by software processes. In such case, the aforementioned units should be considered as conceptual functions required for the process.

The function of the document data generation unit 201 will be described below. The document data generation unit 201 generates document data I4 to be verified. Generated document data I4 is output to the first and second additional information extraction units 202 and 203. Since means for generating document data I4 in the document data generation unit 201 can adopt the same means as those of the image generation unit 101 in FIG. 1, a detailed description thereof will be omitted. Document data I4 generated by the document data generation unit 201 is temporarily held by the RAM 305. Of course, if document data is that output from the image output unit 107 in FIG. 1, it can be verified.

The function of the first additional information extraction unit 202 will be explained below. The first additional information extraction unit 202 receives document data I4 output from the document data generation unit 201 via the RAM 305, and extracts and outputs first additional information Inf2, which is embedded as a digital watermark in input document data I4. Details of the first digital watermark extraction method will be explained later.

If extracted first additional information Inf2 undergoes error correction encoding, an error correction decoding process is executed. On the other hand, when information Inf2 is encrypted, a decryption process is executed. Furthermore, if no first additional information Inf2 is extracted, additional information Inf2 which means that "no first additional information is embedded" (e.g., NULL) is output. Extracted first additional information Inf2 is temporarily held by the RAM 305.

The function of the second additional information extraction unit 203 will be explained below. The second additional information extraction unit 203 receives document data I4 output from the document data generation unit 201 via the RAM 305, and extracts and outputs second additional information Inf3, which is embedded as a digital watermark in input document data I4. Details of the second digital watermark extraction method will be explained later.

If extracted second additional information Inf3 undergoes error correction encoding, an error correction decoding process is executed. On the other hand, when information Inf3 is encrypted, a decryption process is executed. Furthermore, if no second additional information Inf3 is extracted, additional information Inf3 which means that "no second additional information is embedded" (e.g., NULL) is output. Extracted second additional information Inf3 is temporarily held by the RAM 305.

The function of the verification unit 204 will be described below. The verification unit 204 receives first additional information Inf2 extracted by the first additional information extraction unit 202, and second additional information Inf3 extracted by the second additional information extraction unit 203 via the RAM 305, and executes a verification process by comparing input first additional information Inf2 and second additional information Inf3.

In the verification process, if both first additional information Inf2 and second additional information Inf3 are extracted, and are equal to each other, it is determined that input document data is "original". If second additional information Inf3 cannot be extracted, it is determined that "verification is impossible". Otherwise, it is determined that input document data is "copy". Then, the result is output. For example, a message indicating such result can be displayed on a display screen, and its output format is not particularly limited.

Figure 20:
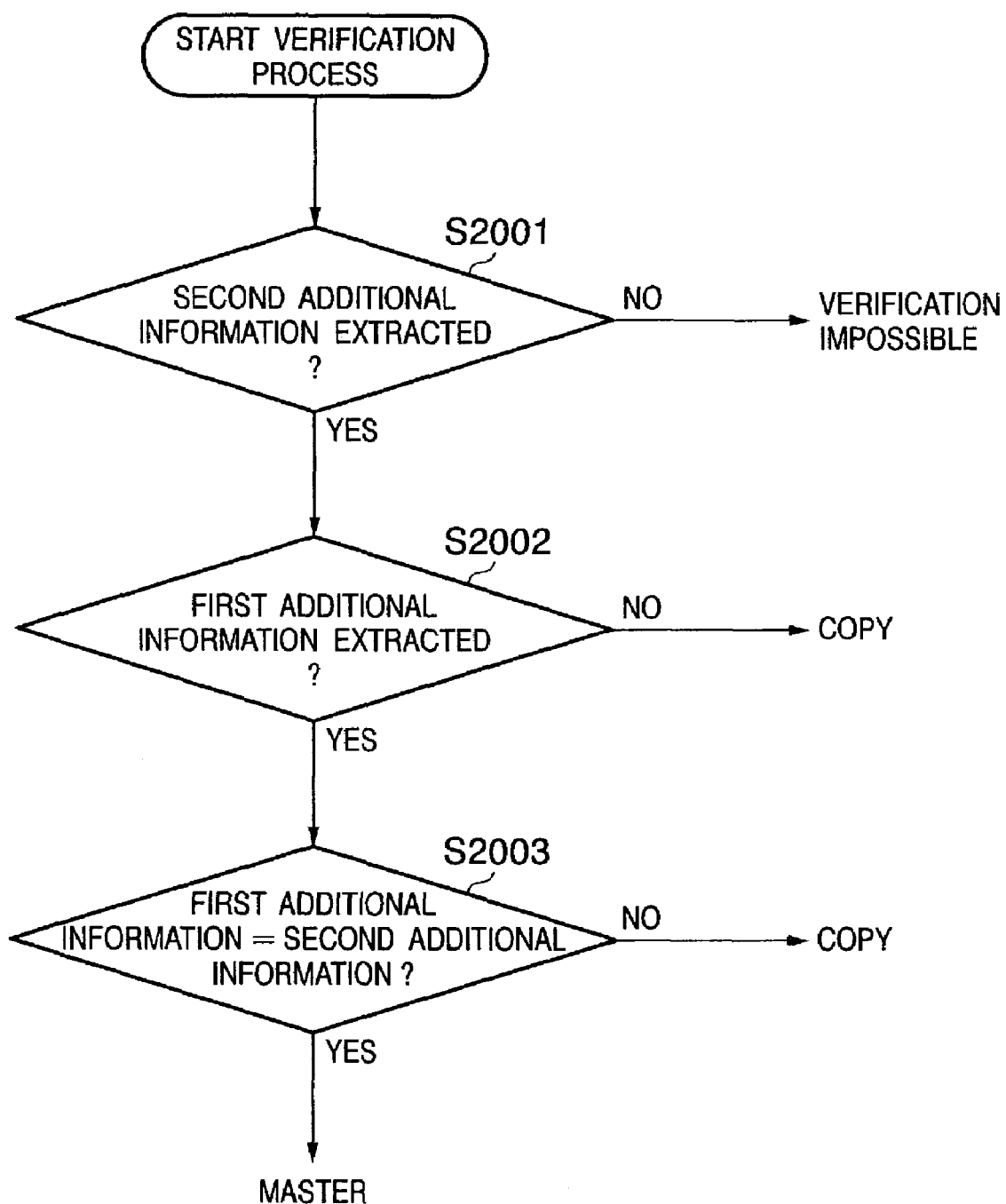
FIG. 20 is a flow chart showing a verification process in the first embodiment.

Details of the flow of the verification process to be implemented by the verification unit 204 will be explained below using FIG. 20.

Step S2001 will be explained first. In step S2001, second additional information Inf3 held by the RAM 305 is read out to check if second additional information Inf3 is extracted. If "Yes" in step S2001, the flow advances to step S2002. On the other hand, if "No" in step S2001, it is determined that "verification is impossible", and the process ends.

The principle of step S2001 will be described below. Second additional information Inf3 is embedded as a digital watermark which is robust against copying. Hence, even when image data I4 obtained by copying image data I3 generated by the signature processor is input to the verification processor, second additional information Inf3 can be correctly extracted. Hence, whether or not image data is an output from the signature processor of this embodiment can be determined by examining if second additional information Inf3 can be correctly extracted. That is, if second additional information Inf3 is extracted, it is determined that image data is an output from the signature processor of this embodiment, and the flow advances to the next step. On the other hand, if second additional information Inf3 cannot be extracted, it is determined that image data is not an output from the signature processor of this embodiment, and the process ends.

Step S2002 will be described below. In this step, first additional information Inf2 held by the RAM 305 is read out to check if first additional information Inf2 is extracted. If "Yes" in step S2002, the flow advances to step S2003. On the other hand, if "No" in step S2002, it is determined that image data is "copy", and the process ends.

The principle of step S2002 will be described below. First additional information Inf2 is embedded as a digital watermark which has no robustness against copying. Hence, when image data I4 obtained by copying image data I3 generated by the signature processor is input to the verification processor, it is difficult to correctly extract first additional information Inf2. Hence, whether or not input document data is a copy can be determined by examining if first additional information Inf2 can be correctly extracted. That is, if first additional information Inf2 cannot be extracted, it is determined that input document data is a copy, and the process ends. On the other hand, if first additional information Inf2 is extracted, the flow advances to the next step to see if input document data is an original.

Step S2003 will be described below. In step S2003, first additional information Inf2 and second additional information Inf3 held by the RAM 305 are read out to see if first additional information Inf2 and second additional information Inf3 match. If the two pieces of information match ("Yes" in step S2003), it is determined that input document data is "original", and the process ends. On the other hand, if the two pieces of information do not match ("No," in step S2003), it is determined that input document data is "copy", and the process ends.

The principle of step S2003 will be described below. Upon execution of step S2003, both first additional information Inf2 and second additional information Inf3 are extracted. As described above, first additional information Inf2 is embedded as a digital watermark which has weak robustness against attacks. Therefore, when document data I4 input to the verification processor of this embodiment is a copy, first additional information Inf2 is more likely to be destroyed even when first additional information Inf2 is extracted in previous step S2002. On the other hand, second additional information Inf3 is embedded as a digital watermark which has strong robustness against attacks, as described above. Therefore, even when document data I4 input to the verification processor of this embodiment is a copy, second additional information Inf3 is unlikely to be destroyed. For these reasons, if the two pieces of extracted information (first additional information Inf2 and second additional information Inf3) match, it can be determined that input document data is "original"; otherwise, it can be determined that input document data is "copy".

Figure 5:
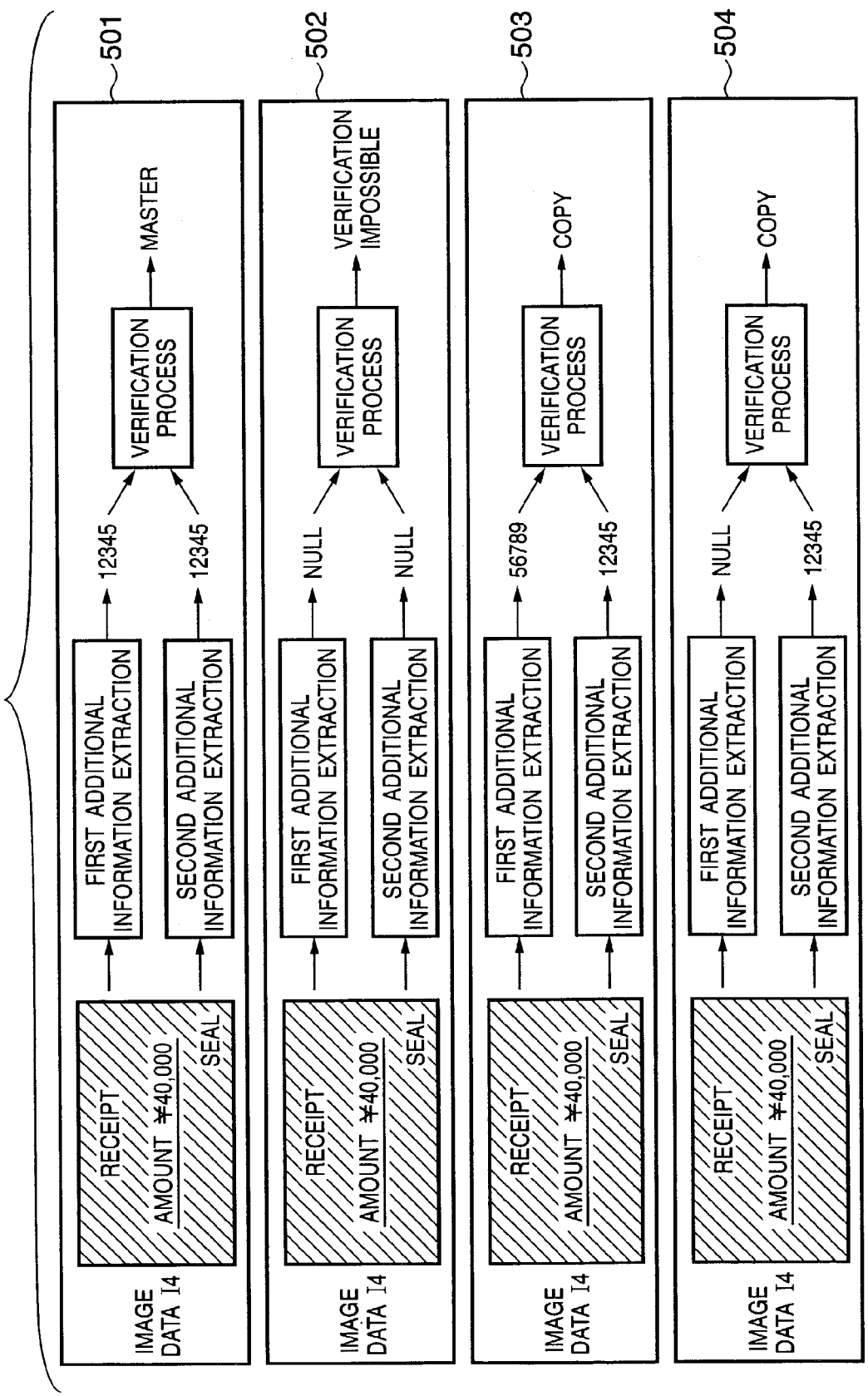
FIG. 5 is a view for explaining the verification processor in the first embodiment.

An example of the verification process to be implemented by the verification unit 204 will be explained below using FIG. 5. Referring to FIG. 5, reference numeral 501 denotes an example of the flow of the process when an original is input; 502, an example of the flow of the process when a document which is not an output from the signature processor of this embodiment is input (i.e., verification is impossible); and 503 and 504, an example when a copy is input.

In the example 501, since first additional information Inf2 (e.g., "12345") matches second additional information Inf3 ("12345"), it is determined that input document data is "original". In the example 502, since second additional information Inf3 ("NULL") indicates that "no second information is extracted or extraction fails", it is determined that "verification is impossible". In the example 503, since first additional information Inf2 ("56789") does not match second additional information Inf3 ("12345"), it is determined that input document data is "copy". Likewise, in the example 504, since first additional information Inf2 ("NULL") indicates that "no first information is extracted", it is determined that input document data is "copy".

The verification result of the verification unit 204 can be presented to the user using the monitor 302, can be stored in the RAM 305, HD 306, or the like and can be used in another system, or can be sent to a system connected to a network using the model 313 and NIC 315.

The verification processor of this embodiment has been explained.

[First Digital Watermark Embedding]

A first digital watermark embedding processor (function) which is applied to the present invention will be described below using FIG. 6.

Digital watermarking to be described below is also called "invisible" digital watermarking, and is a technique for appending a change in level, which is as small as a person can hardly visibly perceive, to original image data I. This change amount is given to a luminance value, density, or the like of image data. One or combinations of such change amounts represent arbitrary additional information.

Furthermore, the first digital watermark in the present invention has relatively weak robustness against attacks as its nature. That is, when image data embedded with the first digital watermark is copied, the first digital watermark is destroyed or erased, and it is difficult to correctly extract the first digital watermark. In the following description, if "digital watermark" simply appears, it means "first digital watermark having relatively weak robustness against attacks".

Figure 6:
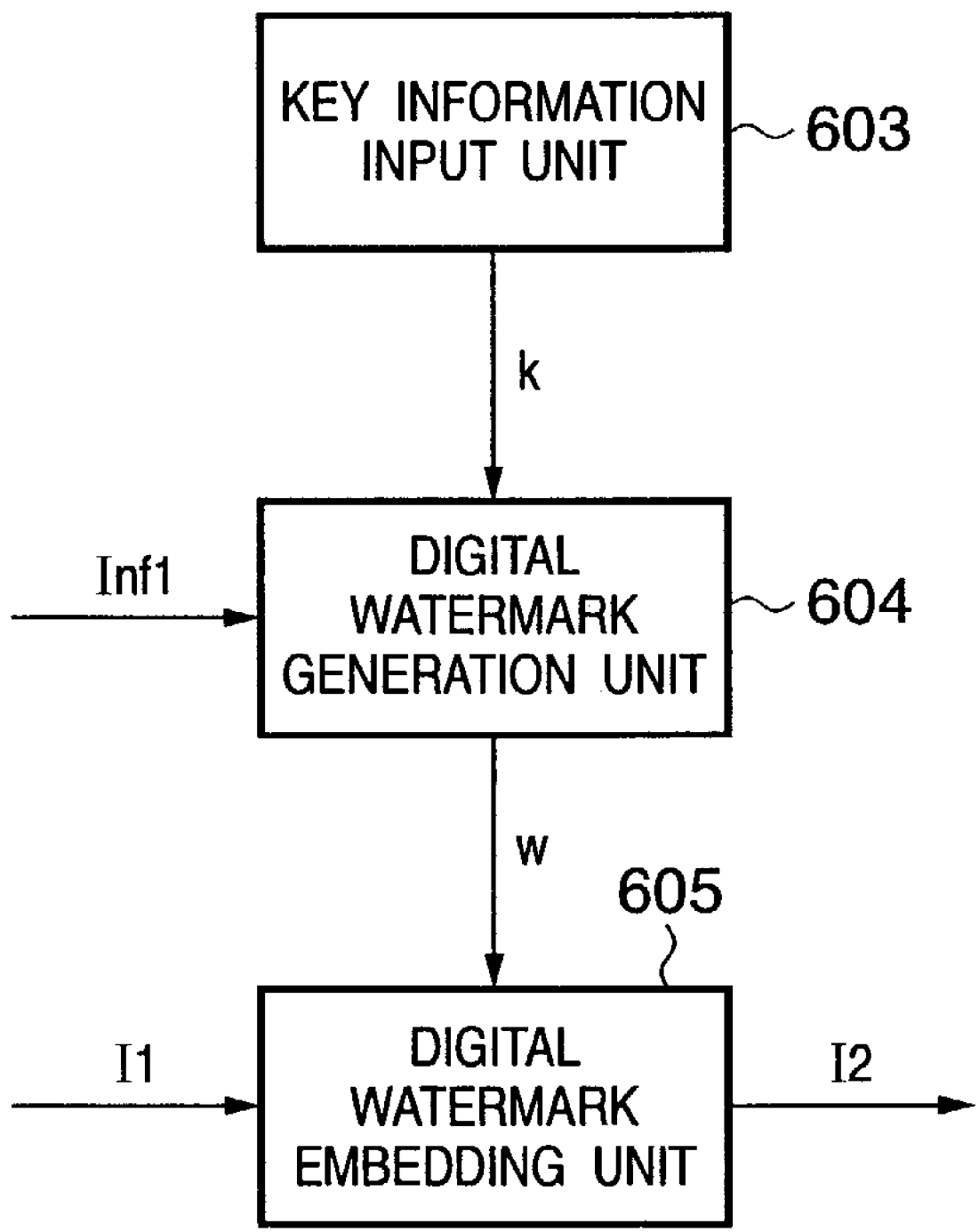
FIG. 6 is a block diagram for explaining a first digital watermark embedding process in the first embodiment.

As shown in FIG. 6, the first additional information embedding processor in the present invention comprises a key information input unit 603, digital watermark generation unit 604, and digital watermark embedding unit 605.

Note that the embedding process to be described below may be implemented by a software process. In this case, the aforementioned units should be considered as conceptual functions required for the process.

The function of the key information input unit 603 will be described below. The key information input unit 603 outputs key information k required to embed and extract additional information Inf. Key information k output from the key information input unit 603 is input to the digital watermark generation unit 604.

Note that key information k is a real number expressed by L (positive number) bits. An example of key information k is "01010101" if it is expressed as a positive number when L=8, and is "85" (decimal notation) if it is expressed as a positive integer. Key information k is given as an initial value of a pseudo random number generation process executed by a pseudo random number generator 702 (to be described later). As long as the digital watermark embedding processor and a digital watermark extraction processor (to be described later) use common key information k, additional information Inf embedded as a digital watermark can be correctly extracted. In other words, only a user who possesses key information k can correctly extract additional information Inf.

The function of the digital watermark generation unit 604 will be explained below. The digital watermark generation unit 604 receives additional information Inf1 from the RAM 305, and key information k from the key information input unit 603, and generates and outputs digital watermark w on the basis of input additional information Inf and key information k.

Figure 7:
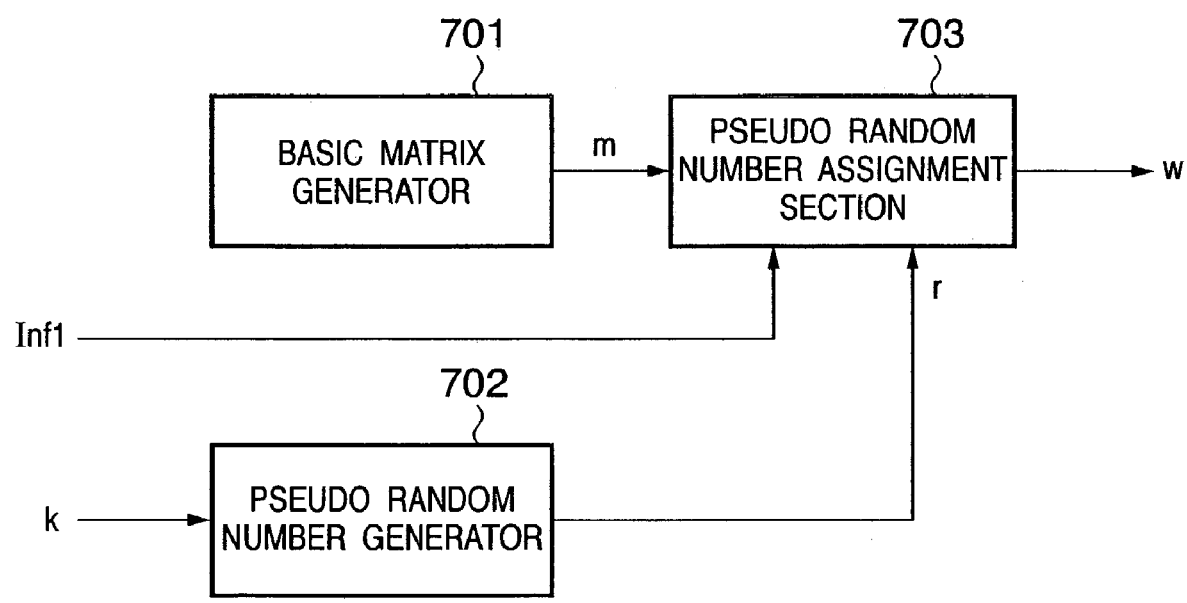
FIG. 7 is a block diagram for explaining a first digital watermark generation unit in the first embodiment.

Details of the function of the digital watermark generation unit 604 will be explained below using FIG. 7. As shown in FIG. 7, the digital watermark generation unit 604 comprises a basic matrix generator 701, pseudo random number generator 702, and pseudo random number assignment section 703.

The function of the basic matrix generator 701 will be explained first. The basic matrix generator 701 generates basic matrix m. Generated basic matrix m is output to the pseudo random number assignment section 703. Note that basic matrix m is used to specify correspondence between the positions of bits which form additional information Inf1, and the pixel positions of image data I1 where respective bits are to be embedded.

The basic matrix generator 701 can selectively use a plurality of basic matrices. A basic matrix to be used must be changed in correspondence with the purpose intended/situation. In the present invention, by switching the basic matrix, an optimal digital watermark (additional information Inf1) can be embedded.

Figure 8:
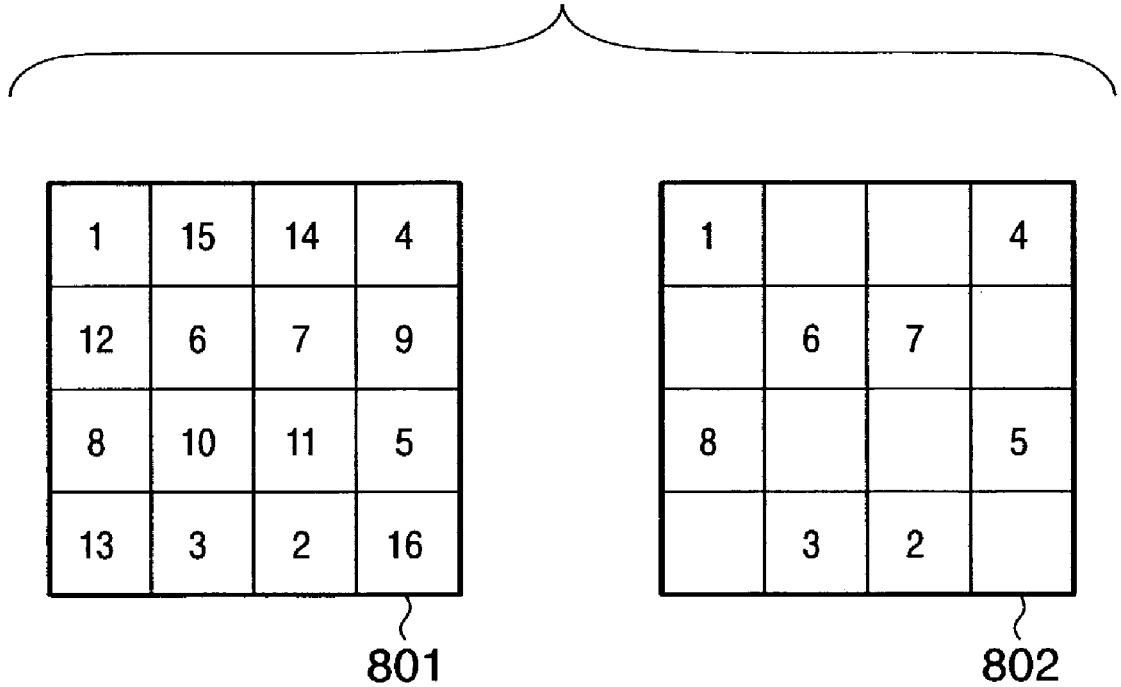
FIG. 8 shows an example of basic matrices in the first embodiment.
Figure 8:
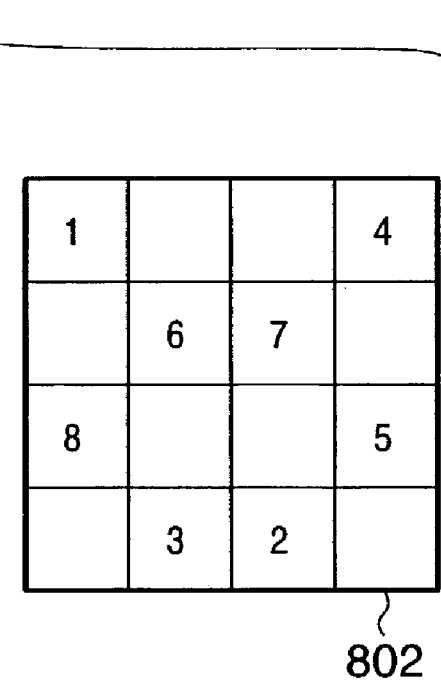
Figure 8:
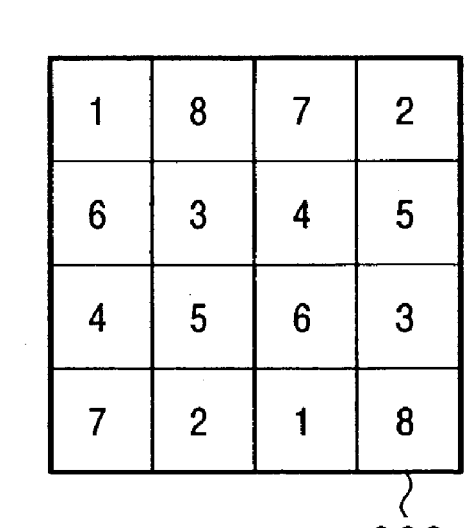
Figure 8:
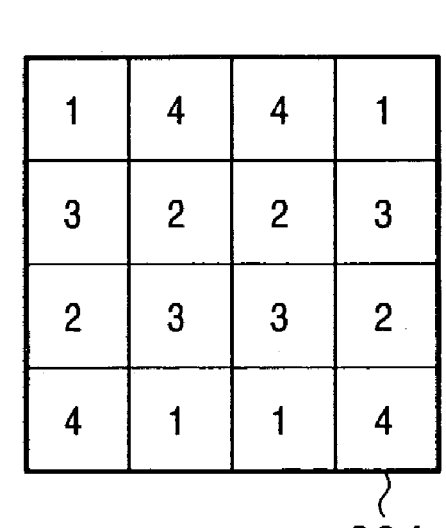

FIG. 8 shows examples of basic matrices m. A matrix 801 is an example of basic matrix m used upon embedding 16-bit additional information Inf. In order to embed 16-bit additional information Inf, as indicated by the matrix 801, for example, 4×4 basic matrix m is used, and numerals ranging from 1 to 16 are assigned to respective elements in the basic matrix.

As can be seen from FIG. 8, the values of elements of basic matrix m correspond to the bit positions of additional information Inf. More specifically, the most significant bit of additional information Inf is embedded at a position where the value of an element in the basic matrix is "1" and, likewise, a bit next to the most significant bit of additional information Inf is embedded at a position where the value of an element in the basic matrix is "2". Then, subsequent bits are embedded in turn.

Modifications of the embedding method from the matrix 801 will be explained below.

A matrix 802 in FIG. 8 is an example of a basic matrix used upon embedding 8-bit additional information Inf. The basic matrix 802 uses only elements having values 1 to 8 of all the elements of the basic matrix 801. Additional information Inf is not embedded at positions of elements having no entries. As shown in the matrix 802, by scattering positions corresponding to respective bits of additional information Inf, a change in image (image quality deterioration) upon embedding a digital watermark (additional information Inf) can be harder to recognize than the matrix 801.

A matrix 803 in FIG. 8 is another example of basic matrix m used upon embedding 8-bit additional information Inf as in the matrix 802. The matrices 802 and 803 are basic matrices which can embed 8-bit additional information Inf. The matrix 802 uses 50% of all pixels to embed additional information Inf, while the matrix 803 uses all pixels (100%) to embed additional information Inf. That is, the matrix 802 embeds 1 bit using one pixel in the basic matrix, while the matrix 803 embeds 1 bit using two pixels in the basic matrix. Hence, by increasing the number of times of embedding bits which represent additional information Inf, as shown in the matrix 803, a digital watermark (additional information Inf) can be extracted more reliably (higher robustness against attacks is obtained) than the matrices 801 and 802, even when an image embedded with that digital watermark has been attacked.

Note that the ratio of pixels used to embed watermark information will be referred to as a filling ratio hereinafter. Note that the filling ratio upon using the matrix 801 is 100%, that upon using the matrix 802 is 50%, and that upon using the matrix 803 is 100%.

A matrix 804 in FIG. 8 uses all pixel to embed additional information Inf as in the matrix 803. That is, the filling ratio is 100%. However, the matrix 803 can embed 8-bit additional information Inf, while the matrix 804 can embed only 4-bit additional information Inf. But the matrix 803 uses two pixels to embed 1 bit, while the matrix 804 embeds 1 bit of additional information Inf using four pixels in the basic matrix. By increasing the number of times of embedding bits that express additional information Inf, as shown in the matrix 804, a digital watermark (additional information Inf) can be extracted more reliably (higher robustness against attacks is obtained) than the matrices 801, 802, and 803, even when an image embedded with that digital watermark has been attacked. However, the information size of additional information Inf to be embedded is 4 bits, and is smaller than the matrices 801, 802, and 803, although higher robustness against attacks can be assured.

The aforementioned four examples can be tabularized as follows:

TABLE 1

| Basic matrix | Filling ratio | Number of pixels used/bit | Information size that can be embedded |
|---|---|---|---|
| 801 | 100% | 1 pixel | 16 bits |
| 802 | 50% | 1 pixel | 8 bits |
| 803 | 100% | 2 pixels | 8 bits |
| 804 | 100% | 4 pixels | 4 bits |

In this manner, by selecting the configuration of basic matrix m, the filling ratio, the number of pixels to be used to embed 1 bit, and the information size that can be embedded can be selectively set. In Table 1 above, the filling ratio is a parameter that influences the image quality of an image in which a digital watermark is embedded, and the number of pixels used to embed 1 bit is a parameter that mainly influences the robustness against attacks. Therefore, an image embedded with a digital watermark suffers larger quality deterioration with increasing filling ratio. Also, the robustness against attacks becomes higher with increasing number of pixels used to embed 1 bit.

As can be seen from the above description, the image quality of an image to be embedded with a digital watermark, robustness against attacks, and information size of additional information that can be embedded have a trade-off relationship upon implementing digital watermarking.

In this embodiment, the robustness of a digital watermark, image quality, and information size can be controlled and set by adaptively selecting a plurality of types of basic matrices m. However, in this embodiment, the first additional information must be embedded to have no robustness against copying.

Basic matrix m generated as described above is output to the pseudo random number assignment section 703.

The function of the pseudo random number generator 702 will be explained below. The pseudo random number generator 702 receives key information k, and generates pseudo random number sequence r on the basis of key information k. Generated random number sequence r is output, and is input to the pseudo random number assignment section 703. Note that pseudo random number sequence r is a real number sequence (a plurality of real numbers) according to a uniform distribution included within the range $\{-1, 1\}$. Furthermore, key information k is used as an initial value upon generating a pseudo random number sequence. That is, a first pseudo random number sequence generated using first key information is different from a second pseudo random number sequence generated using second key information. Since a method of generating pseudo random number sequence r is known to those who are skilled in the art, a detailed description thereof will be omitted. Generated pseudo random number sequence r is output to the pseudo random number sequence assignment section 703.

The function of the pseudo random number assignment section 703 will be described below. The pseudo random number assignment section 703 receives basic matrix m and pseudo random number sequence r, and assigns respective elements of pseudo random number sequence r to predetermined elements of basic matrix m. Basic matrix m to predetermined elements of which respective elements of the random number sequence are assigned will be referred to as digital watermark w hereinafter. The pseudo random number assignment section 703 outputs generated digital watermark w.

Details of the process for assigning respective elements of pseudo random number sequence r to predetermined elements of basic matrix m will be described below using examples.

A case will be exemplified wherein the basic matrix 804 shown in FIG. 8 is used. As described above, 4-bit information can be embedded using the basic matrix 804.

Initially, of respective elements in the matrix 804, those having a value "1" are scanned in the raster order to assign respective elements of random number sequence r in turn. In this case, assignment is made in accordance with additional information Inf. That is, if a bit of additional information Inf is "1", an element of pseudo random number sequence r is assigned intact; if a bit of additional information Inf is "0", a value obtained by multiplying an element of pseudo random number sequence r by "−1" is assigned.

Figure 9:
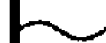
FIG. 9 shows an example of a first digital watermark in the first embodiment.

Then, the same process is repeated for elements having a value "2". The aforementioned process is repeated up to elements having a value n (the number of bits to be embedded). FIG. 9 shows an example of digital watermark w generated by the aforementioned example. A digital watermark 901 in FIG. 9 is generated when, for example, a real number sequence r={0.7, −0.6, −0.9, 0.8. . . } is used as pseudo random number sequence r, and 4-bit information "1001" is used as additional information Inf.

Details of the above process will be explained below. Note that a left-to-right scan is made in the order of the first, second, . . . rows.

The most significant bit of additional information Inf is "1", and the first corresponding random number is 0.7. Therefore, the first pseudo random number "0.7" is assigned to a position of "1" which is detected first upon scanning the basic matrix 804. The second pseudo random number "−0.6" is assigned to a position of "1" which is detected next. Likewise, every time "1" of the basic matrix is detected, a pseudo random number of the corresponding order is assigned.

When a bit "0" next to the most significant bit of additional information Inf is embedded, a value obtained by multiplying a pseudo random number by −1 is assigned. That is, pseudo random numbers {−0.7, 0.6, 0.9, −0.8. . . }, whose sign is inverted, are assigned in turn every time "2" of the basic matrix is detected.

The same process is repeated for the third and fourth bits of additional information Inf, thereby obtaining digital watermark w, i.e., the watermark 901 shown in FIG. 9.

Digital watermark w generated in this way is output from the digital watermark generation unit 604, and is input to the digital watermark embedding unit 605.

In the above example, 4×4 basic matrices are used to embed additional information Inf each consisting of 16 bits, 8 bits, and 4 bits. However, this embodiment is not limited to such specific example. For example, more pixels may be used to 1 bit, and a basic matrix with a larger size may be used. Such example is also included in the scope of the present invention. If a basic matrix with a larger size is used, a pseudo random number sequence uses a longer real number sequence. In practice, the aforementioned random number sequence which consists of four elements may disturb a normal function of a digital watermark extraction process (to be described later). (More specifically, although additional information Inf is embedded, correlation coefficients between integrated image c and digital watermarks w1, w2, . . . , wn may become small.) Hence, in order to embed, e.g., 64-bit additional information, a 256×256 basic matrix m can be used at a filling ratio of 50%. (In this case, 512 pixels are used to embed 1 bit.) The function of the digital watermark embedding unit 605 will be described below. The digital watermark embedding unit 605 receives image data I and digital watermark w, embeds digital watermark w in image data I, and outputs image data I' embedded with digital watermark w.

Details of the process of the digital watermark embedding unit 605 will be described below. The digital watermark embedding unit 605 executes a digital watermark embedding process according to:

$$I'_{i,j} = I_{i,j} + aw_{i,j} \quad (1)$$

where $I'_{i,j}$ is the image data embedded with the digital watermark, $I_{i,j}$ is the image data before the digital watermark is embedded, $w_{i,j}$ is the digital watermark, i and j are parameters indicating x- and y-coordinate values of I, I', and w, and a is a parameter for setting the strength of the digital watermark.

For example, if a="10", a digital watermark to be embedded assumes a value ranging from −10 to +10. By increasing value a, a digital watermark with higher robustness against attacks can be embedded, but image quality deterioration becomes larger. On the other hand, by decreasing value a, the robustness against attacks decreases, but image quality deterioration can be suppressed. As in the aforementioned configuration of basic matrix m, the balance between the robustness against attacks and image quality of an image embedded with a digital watermark can be adjusted by appropriately setting value a (e.g., set by the mouse or keyboard on a GUI window upon embedding a digital watermark).

Figure 10:
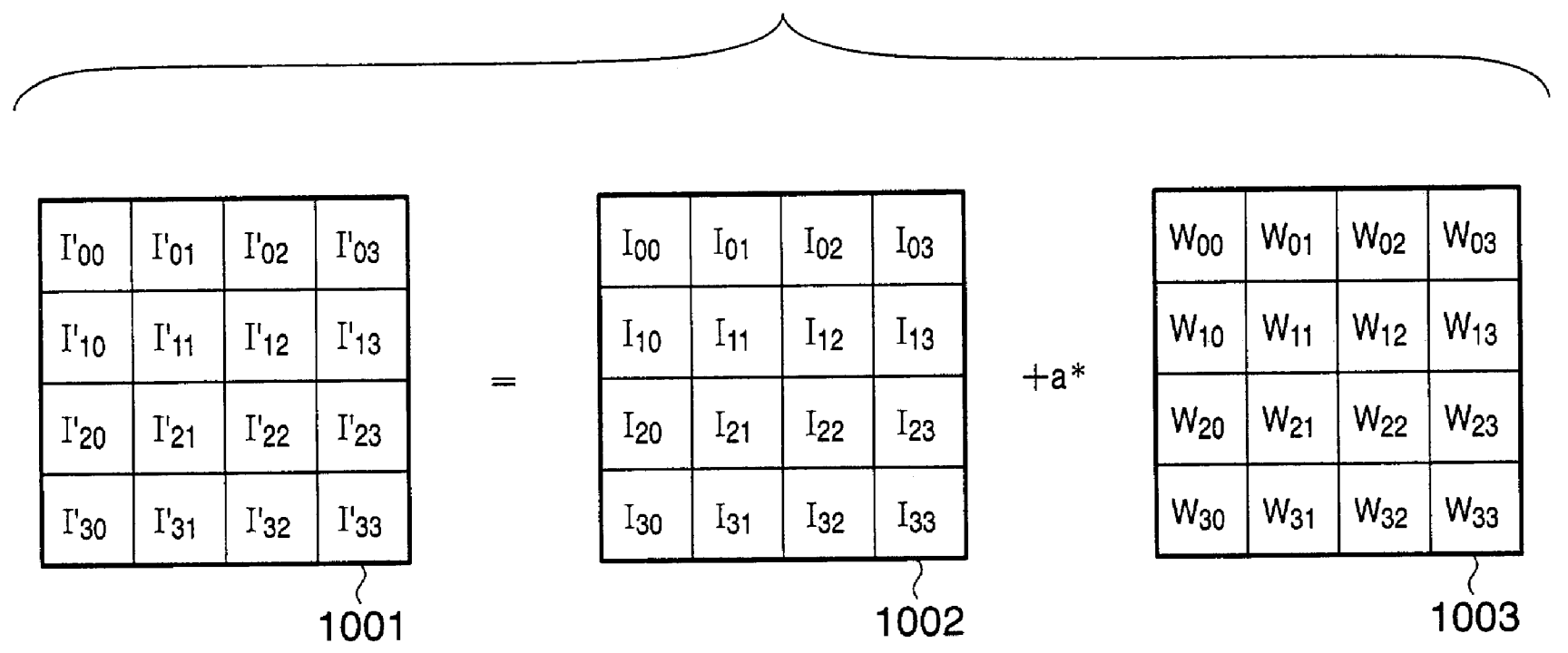

FIG. 10 shows a practical example of the digital watermark embedding process given by equation (1) when 4×4 basic matrix m is used. Referring to FIG. 10, reference numeral 1001 denotes I' in equation (1); 1002, I; and 1003, w. As shown in FIG. 10, arithmetic operations of equation (1) are made for respective elements in the matrix.

The arithmetic process given by equation (1) (FIG. 10) is repeated for whole input image data I in practice. For example, if input image data I is made up of 24×24 pixels, it has 6 (vertical)×6 (horizontal) blocks each consisting of 4×4 pixels, as shown in FIG. 11, and the embedding process is executed for each block (4×4 pixels).

Figure 11:
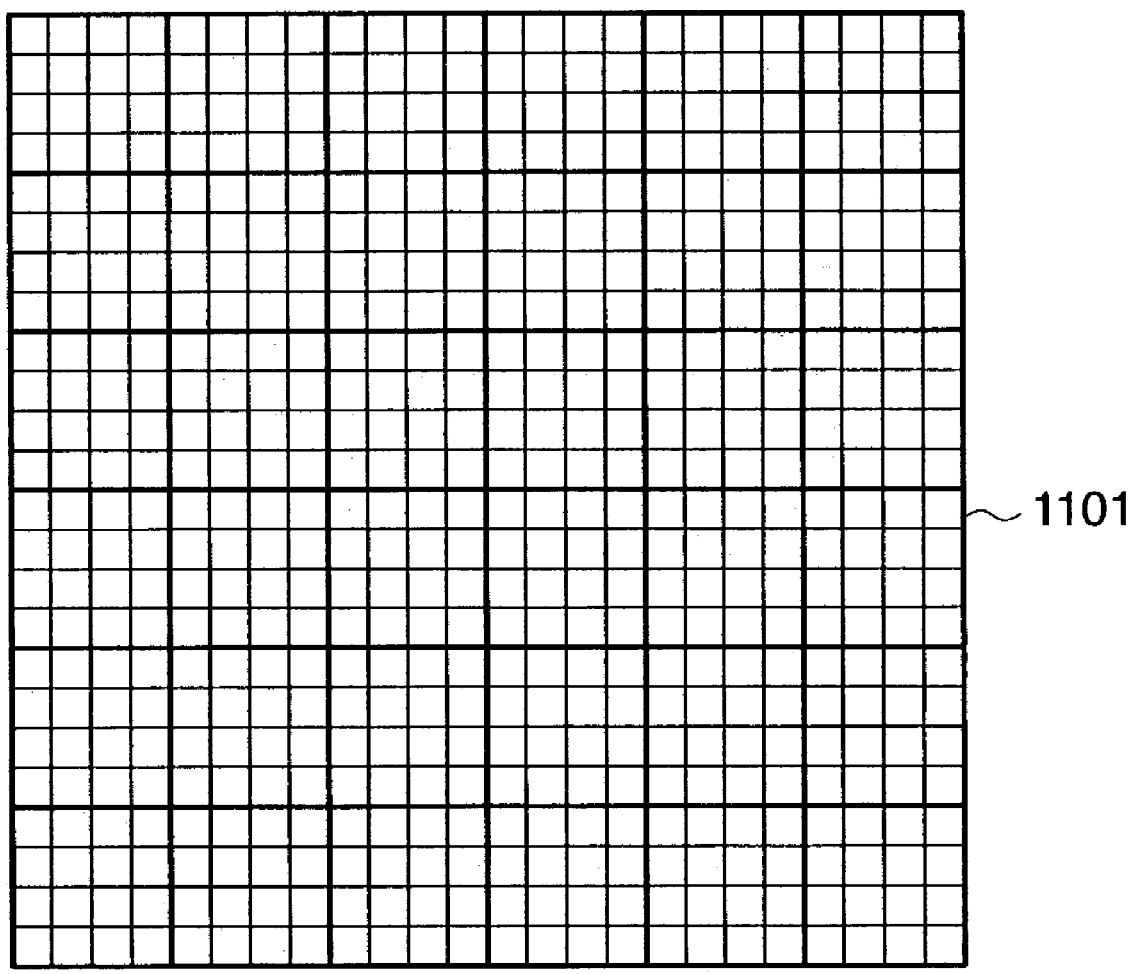
FIG. 11 shows macroblocks in the first embodiment.

As shown in FIG. 11, input image data I is broken up into blocks each of which consists of 4×4 pixels, and which do not overlap each other, and the arithmetic process given by equation (1) (FIG. 10) is repeated for respective blocks. A block which is to undergo the process given by equation (1) (FIG. 10) will be referred to as a macroblock hereinafter.

By repeating the digital watermark embedding process for all macroblocks, digital watermarks can be consequently embedded in the entire image. Furthermore, one macroblock is embedded with additional information Inf consisting of n bits. Hence, embedded additional information Inf can be extracted if there is at least one macroblock. In other words, the extraction process of embedded additional information Inf does not require the entire image, and only a portion of image data I (at least one macroblock) suffices to execute that process.

Such feature that additional information Inf can be completely extracted from a portion of image data I will be referred to as "having clipping robustness". By repeating the digital watermark embedding process for respective macroblocks over the entire image, each digital watermark can have clipping robustness. Watermarked image data I' generated in this way becomes a final output of the digital watermark embedding processor via the image output unit 606.

[First Digital Watermark Extraction Processor]

The method of extracting a digital watermark embedded by the aforementioned first digital watermark embedding processor will be explained below. A digital watermark extraction processor (function) which is applied to this embodiment will be explained below using FIG. 12.

Figure 12:
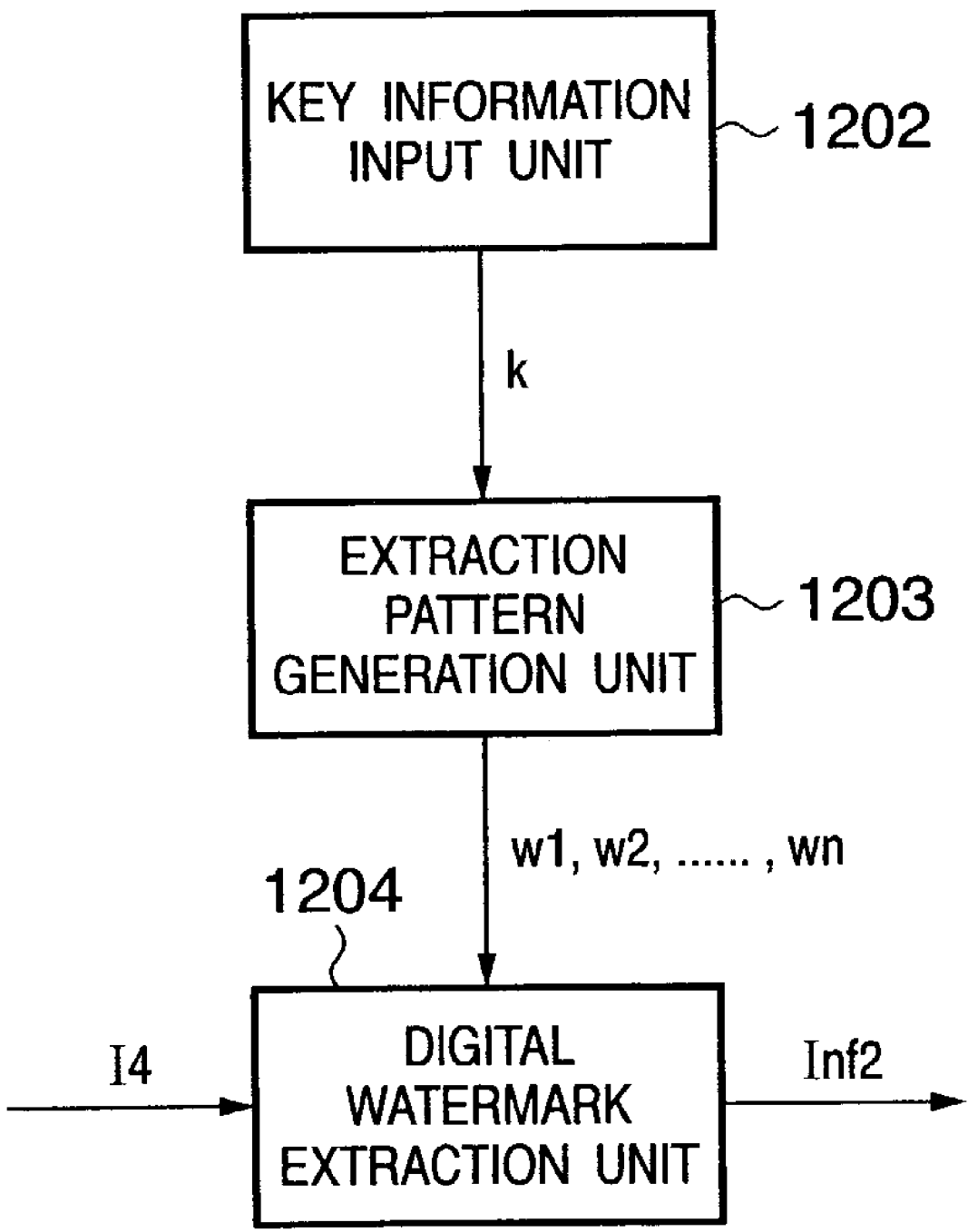
FIG. 12 is a block diagram for explaining a first digital watermark extraction process in the first embodiment.

As shown in FIG. 12, the extraction processor of this embodiment comprises a key information input unit 1202, extraction pattern generation unit 1203, and digital watermark extraction unit 1204.

Note that the extraction process to be described below may be implemented by software processes. In such case, the aforementioned units should be considered as conceptual functions required for the process.

The function of the key information input unit 1202 will be described below. The key information input unit 1202 receives key information k required to extract a digital watermark, and its output is supplied to the extraction pattern generation unit 1203. Note that input key information k must be the same as that input by the key information input unit 603 of the aforementioned digital watermark embedding processor. If different key information is input, additional information cannot be normally extracted. In other words, only the user who has correct key information k can extract correct additional information Inf2.

The function of the extraction pattern generation unit 1203 will be described below. The extraction pattern generation unit 1203 receives key information k from the key information generation unit 1202, generates an extraction pattern on the basis of input key information k, and outputs the generated extraction pattern.

Figure 13:
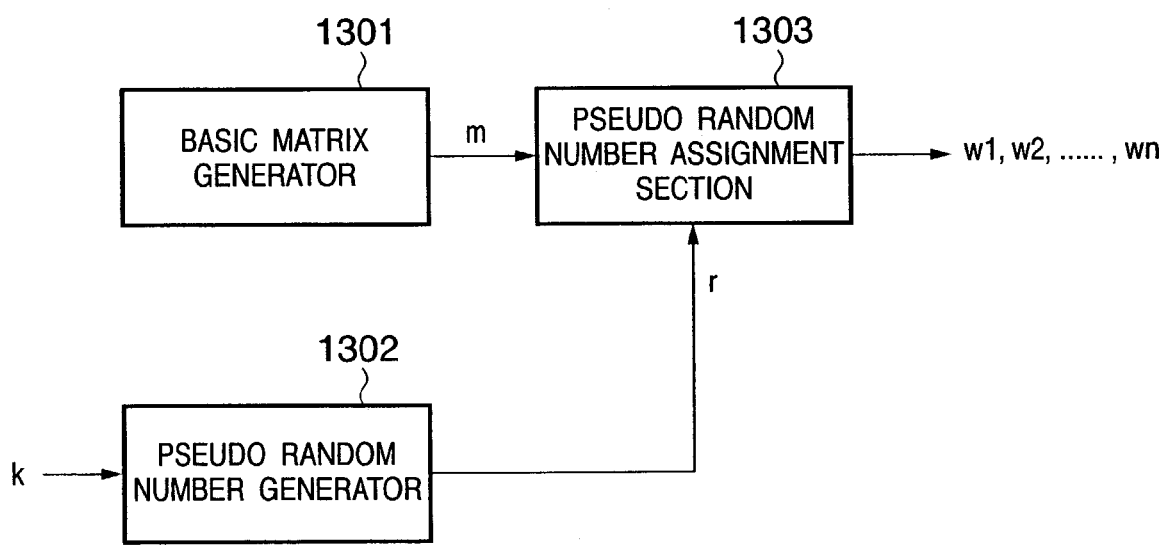
FIG. 13 is a block diagram showing an example of an extraction pattern generation unit in the first embodiment.

Details of the function of the process of the extraction pattern generation unit 1203 will be described below using FIG. 13. As shown in FIG. 13, the extraction pattern generation unit 1203 comprises a basic matrix generator 1301, pseudo random number generator 1302, and pseudo random number assignment section 1303.

Since the basic matrix generator 1301 and pseudo random number generator 1302 execute the same operations as those of the aforementioned basic matrix generator 701 and pseudo random number generator 702, a detailed description thereof will be omitted. Note that additional information cannot be normally extracted unless the basic matrix generators 1301 and 701 generate identical basic matrices.

Details of the function of the pseudo random number assignment section 1303 will be explained below. The pseudo random number assignment section 1303 receives basic matrix m and pseudo random number sequence r, and assigns respective elements of pseudo random number sequence r to predetermined elements of basic matrix m. The difference between this assignment section 1303 and the pseudo random number assignment section 703 used in the aforementioned embedding processor is that the pseudo random number assignment section 703 outputs only one extraction patterns w, while the pseudo random number assignment section 1303 outputs extraction patterns (n patterns in this case) corresponding to the number of bits of the embedded information size.

Details of the function of assigning respective elements of pseudo random number sequence r to predetermined elements of basic matrix m will be explained taking the matrix 804 shown in FIG. 8 as an example. When the matrix 804 is used, 4-bit additional information can be embedded, i.e., four extraction patterns w1, w2, w3, and w4 are output.

Initially, of respective elements of the matrix 804, those having a value "1" are scanned in the raster order to assign respective elements of pseudo random number sequence r to them. Upon completion of assignment of respective elements of pseudo random number sequence r to all elements having a value "1", a matrix to which pseudo random number sequence r is assigned is generated as extraction pattern w1. FIG. 14 shows an example of extraction patterns. Extraction pattern w1 (1401) is an example obtained when a real number sequence r={0.7, −0.6, −0.9, 0.8} is used as pseudo random number sequence r. The aforementioned process is repeated for the remaining elements having values "2", "3", and "4" of those of the matrix 804 to generate extraction patterns w2 (1402), w3 (1403), and w4 (1404), respectively. A pattern obtained by superposing all extraction patterns w1, w2, w3, and w4 generated in this way becomes equal to digital watermark w generated by the digital watermark embedding processor. Generated extraction patterns w1, w2, w3, and w4 are output from the extraction pattern generation unit 1203, and are input to the digital watermark extraction unit 1204.

The function of the digital watermark extraction unit 1204 will be explained below. The digital watermark extraction unit 1204 receives image data I4 and extraction patterns w1, w2, ..., wn, extracts additional information Inf2 from image data I4 using extraction patterns w1, w2, ..., wn, and outputs extracted additional information Inf2. In this case, it is desired that additional information Inf2 to be extracted is equal to embedded additional information Inf1. However, if image data I4 embedded with a digital watermark has suffered various attacks, additional information Inf1 does not always match additional information Inf2.

Details of the function of the digital watermark extraction unit 1204 will be explained below. The digital watermark extraction unit 1204 calculates cross-correlation values between integrated image c generated from input image data I4 and extraction patterns w1, w2, ..., wn. Integrated image c is obtained by dividing image data I4 into blocks each of which has the size of a macroblock (the size of the basic matrix) and which do not overlap each other, and calculating the average of element values of each divided block.

Figure 15:
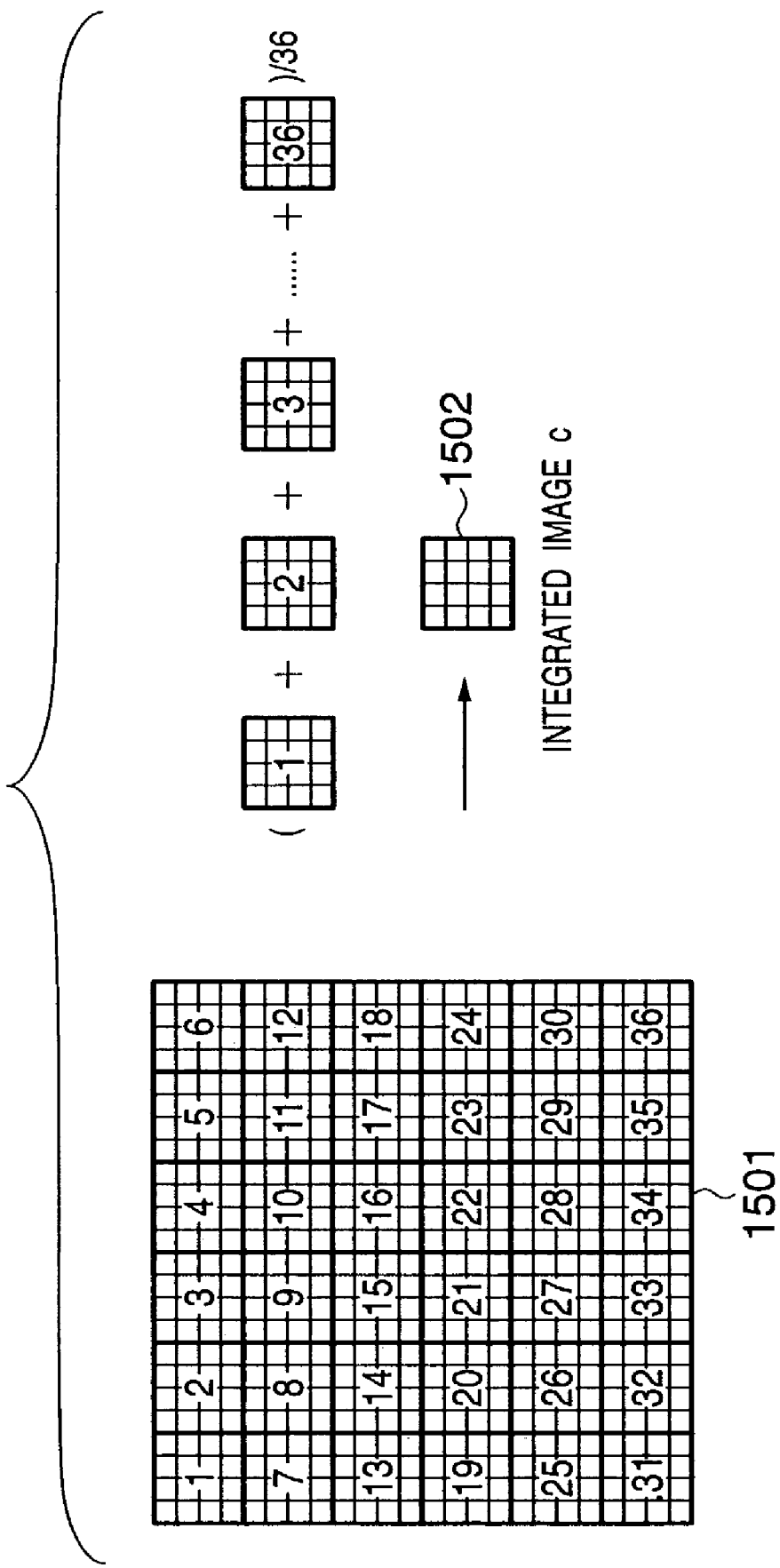
FIG. 15 is a view for explaining an example of a first digital watermark extraction process using an integrated image in the first embodiment.

Integrated image c will be explained below using a practical example shown in FIG. 15. FIG. 15 shows an example of integrated image c when extraction patterns of 4×4 pixels, and image data I4 of 24×24 pixels are input. Referring to FIG. 15, reference numeral 1501 denotes an example of blocks of 4×4 pixels, which are obtained by dividing image data I4 of 24×24 pixels, and do not overlap each other. In the example shown in FIG. 15, the image data is broken up into 36 blocks. Integrated image c (1502) is obtained by calculating the average values of respective element values of these 36 blocks.

Cross-correlation values between integrated image c generated in this way, and extraction patterns w1, w2, ... wn are calculated respectively. An example of a method of calculating a correlation coefficient will-be explained below taking a calculation of a correlation coefficient between integrated image c and extraction pattern wn as an example.

A correlation coefficient is a statistical quantity used to measure similarity between integrated image c and extraction pattern wn, and is given by:

$$\rho = c'^T \cdot w'_n / \{|c'^T| |w'_n|\} \quad (2)$$

where c' and w'n are matrices each of which has as elements the differences obtained by subtracting the average values of the elements of each matrix from respective elements, and $c^T$ is the transposed matrix of c. Correlation coefficient $\rho$ assumes a value ranging from −1 to +1. If positive correlation between integrated image c and extraction pattern wn is strong, $\rho$ approaches +1; if negative correlation between integrated image c and extraction pattern wn is strong, $\rho$ approaches −1. "Positive correlation is strong" means that "extraction pattern wn becomes larger with increasing integrated image c", and "negative correlation is strong" means that "extraction pattern wn becomes smaller with increasing integrated image c". When integrated image c and extraction pattern wn have no correlation, $\rho=0$.

Based on the cross-correlation results calculated in this way, whether or not additional information Inf2 is embedded in input image data I4 and whether each bit that forms additional information Inf2 is "1" or "0" if the additional information is embedded are determined.

The correlation coefficients between integrated image c and extraction patterns w1, w2, ..., wn are calculated, and if each calculated cross-correlation result is close to zero, it is determined that "no additional information is embedded"; if each cross-correlation result is a positive number separated from zero, it is determined that "bit 1" is embedded; and if each cross-correlation result is a negative number separated from zero, it is determined that "bit 0" is embedded.

In other words, if a positive value $\epsilon$ is defined, when $$-\epsilon < \rho < \epsilon$$

holds, it is determined that no additional data is embedded or verification is impossible.

When $\rho \leq -\epsilon$ or $\rho \geq \epsilon$, it is determined that additional data is present. Note that this $\epsilon$ can be appropriately set.

Calculating cross-correlation is equivalent to evaluation of similarities between integrated image c and extraction patterns w1, w2, ..., wn. That is, when the aforementioned digital watermark embedding processor embeds extraction patterns w1, w2 ..., wn in image data I4 (integrated image c), they are relatively similar to each other, and such similarity levels are calculated as cross-correlation values. Furthermore, when bit "1" is embedded (when extraction patterns w1, w2, . . . , wn are added), positive cross-correlation values are obtained, while when bit "0" is embedded (when extraction patterns w1, w2, . . . , wn are subtracted), a negative cross-correlation values are obtained.

Figure 16:
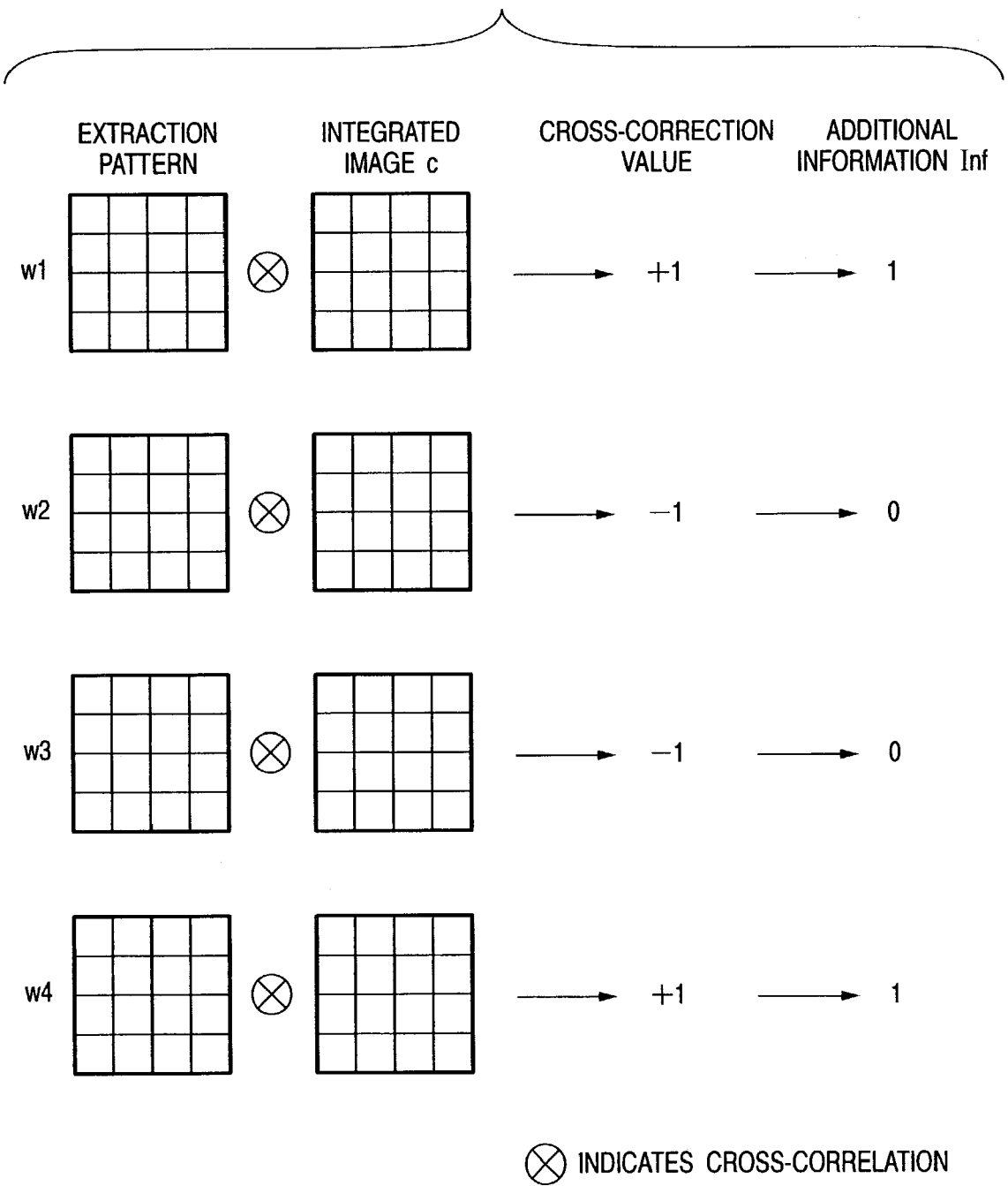
FIG. 16 is a view for explaining an example of first digital watermark extraction arithmetic operations using an integrated image in the first embodiment.

FIG. 16 shows an example wherein a digital watermark is extracted from image data I4 (integrated image c) embedded with the aforementioned 4-bit additional information "1001" using w1, w2, w3, and w4.

The cross-correlation values between integrated image c and four extraction patterns w1, w2, . . . , wn (corresponding to 4-bit additional information Inf2) are respectively calculated. When additional information Inf2 is embedded in input image data I4 (integrated image c), correlation coefficients are respectively calculated as "1, −1, −1, 1". Based on these calculation results, it is determined that additional information Inf2 is "1001", and 4-bit additional information Inf2 can be finally extracted.

Extracted n-bit additional information Inf2 is output as a finally extracted binary data sequence (additional information Inf2). Output additional information Inf2 is temporarily held by the RAM 305.

[Second Digital Watermark Embedding Processor]

A second digital watermark embedding processor (function) which is applied to this embodiment will be described below using FIG. 21.

A second digital watermark to be described below is also called an "invisible" document image digital watermark, and is a change itself in original document data D1, which is small to such a degree that a person can hardly visibly perceive. This change amount is given to an interval between neighboring characters of image data. One or combinations of such change amounts represent arbitrary additional information.

Furthermore, the second digital watermark in this embodiment has relatively strong robustness against attacks as its nature. That is, even when image data embedded with the second digital watermark is copied, the second digital watermark can be correctly extracted. In the following description, if "digital watermark" simply appears, it means "second digital watermark having relatively strong robustness against attacks".

Figure 21:
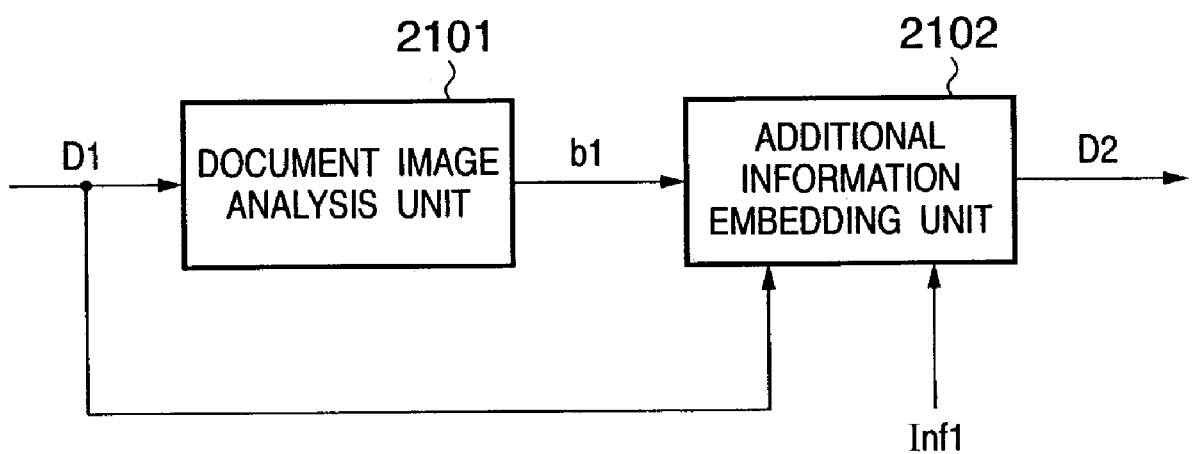
FIG. 21 is a block diagram for explaining a second digital watermark embedding process in the second embodiment.

As shown in FIG. 21, a second additional information embedding processor in this embodiment comprises a document image analysis unit 2101 and additional information embedding unit 2102.

Note that the embedding process to be described below may be implemented by software processes. In such case, the aforementioned units should be considered as conceptual functions required for the process.

The function of the document image analysis unit 2101 will be described below. The document image analysis unit 2101 receives document data D1, executes a document image analysis process of input document data D1, and outputs circumscribing rectangle information b1 as a result of the analysis process.

The document image analysis process will be described below. The document image analysis process is a process for dividing input document data into a text region and a graphics region such as a graph and the like, and also extracting circumscribing rectangles from the text region for respective character elements. As can be seen from the following description, a circumscribing rectangle to be extracted need not always be that of a character, and need only be that of a partial image. However, for the sake of simplicity, a circumscribing rectangle to be extracted will be explained as that of a character.

Note that a character element indicates a rectangular region extracted using projection, and corresponds to either one character or a constituting element (radical or the like) of a character. In this way, extracted circumscribing rectangle information b1 is output. Output circumscribing rectangle information b1 is temporarily held by the RAM 305.

The function of the additional information embedding unit 2102 will be described below. The additional information embedding unit 2102 receives document data D1, circumscribing rectangle information b1, and additional information Inf1 from the RAM 305, embeds, as a digital watermark, additional information Inf1 in document data D1 using circumscribing rectangle information b1, and outputs that result as document data D2.

The digital watermark embedding process is described below. The digital watermark embedding process is a process for calculating the space lengths between neighboring circumscribing rectangles on the basis of the input circumscribing rectangle information b1, and shifting regions in the circumscribing rectangles of characters to the right or left to embed 1 bit on the basis of predetermined embedding rules, thereby embedding additional information Inf1.

Figure 23:
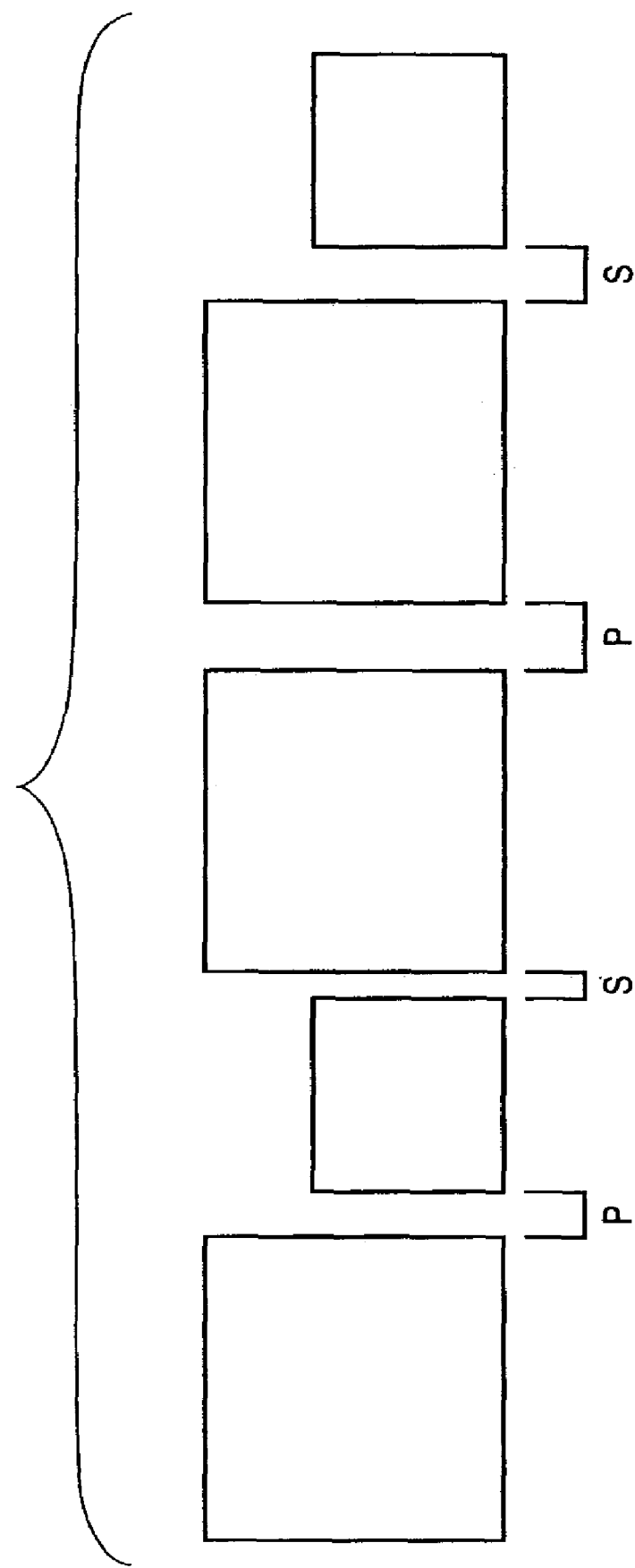
FIG. 23 is a view for explaining circumscribing rectangle information used in a second digital watermark in the second embodiment.

The embedding rules will be explained below using an example. Let P and S be the space lengths before and after a character where 1-bit information of additional information Inf1 is embedded, as shown in FIG. 23. Every other characters except for the two end characters of a line are determined as those used to embed 1 bit. (P−S)/(P+S) is calculated for space lengths P and S, and the result is quantized by an appropriate quantization step. "0" or "1" is alternately assigned to a quantization representative value.

Upon extracting a digital watermark, an embedded value can be extracted by, for example:

$$\text{Value} = \text{floor}\{(P-S)/((P+S)\times\alpha))\} \bmod 2 = 0 \text{ or } 1 \quad (3)$$

where $\alpha$ is the quantization step, and is a real number which satisfies $0<\alpha<1$.

Upon embedding a digital watermark, equation (3) is calculated while shifting (translating) a region in a circumscribing rectangle of a character or character element used to embed 1 bit to the right or left pixel by pixel, and the direction (right or left) and width (the number of pixels) of translation are explored until equation (3) yields a bit value (0 or 1) to be embedded.

Figure 24:
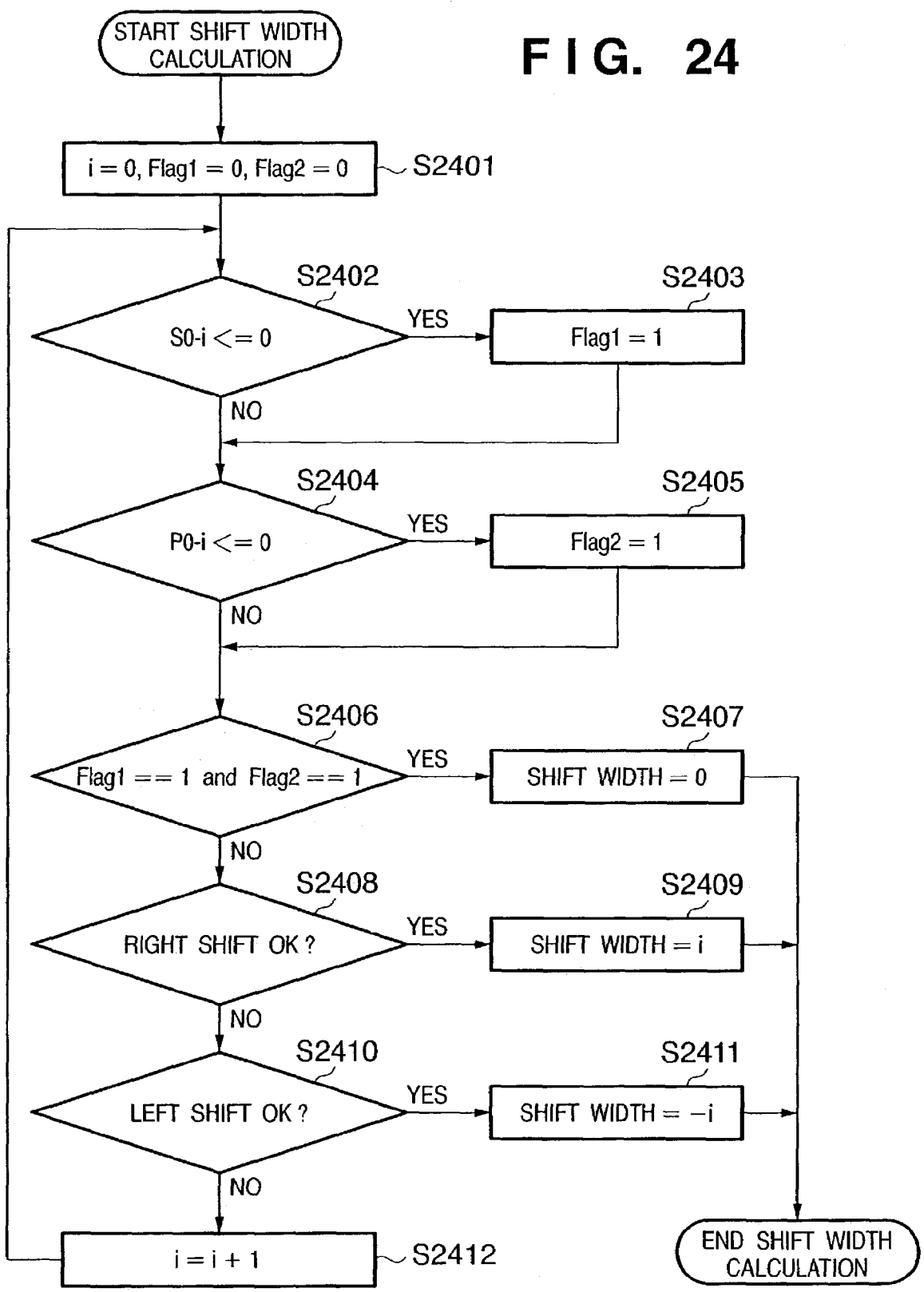
FIG. 24 is a flow chart of a shift width calculation process used to embed the second digital watermark in the second embodiment.
Figure 25:
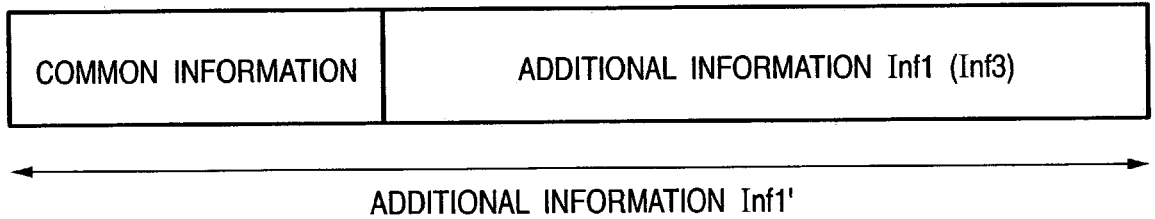
FIG. 25 shows the structure of additional information in the second embodiment.

The detailed flow of this exploration process will be described below using FIG. 24.

Step S2401 will be described first. In step S2401, variables are reset. Note that variable i indicates a candidate of the translation shift width. Variable Flag1 indicates whether or not a character to be shifted to embed information touches a neighboring character if it is shifted distance i to the right, and assumes "1" if that character touches a neighboring character. Variable Flag2 indicates whether or not a character to be shifted touches a neighboring character if it is shifted distance i to the left, and assumes "1" if that character touches a neighboring character.

Step S2402 will be described below. It is determined in step S2402 whether or not a character or character element to be shifted to embed information touches a right neighboring character or character element if it is translated distance i to the right. If "Yes" in step S2402 (the character touches the neighboring character), the flow advances to step S2403. If "No" in step S2402 (the character does not touch the neighboring character), the flow advances to step S2404.

Step S2403 will be described below. In step S2403, variable Flag1 is set to "1", and the flow advances to step S2404.

Step S2404 will be described below. It is determined in step S2404 whether or not a character or character element to be shifted to embed information touches a left neighboring character or character element if it is translated distance i to the left. If "Yes" in step S2404 (the character touches the neighboring character), the flow advances to step S2405. If "No" in step S2404 (the character does not touch the neighboring character), the flow advances to step S2406.

Step S2405 will be described below. In step S2405, variable Flag2 is set to "1", and the flow advances to step S2406.

Step S2406 will be described below. It is determined in step S2406 whether or not a character or character element to be shifted to embed information touches both right and left neighboring characters if it is translated distance i to the right and left. If "Yes" in step S2406 (the character touches both the right and left characters), the flow advances to step S2407. If "No" in step S2406 (the character does not touch both the right and left characters), the flow advances to step S2408.

Step S2407 will be described below. In step S2407, the shift width is set to "0", and the shift width calculation process ends. In this case, it is determined that it is impossible to embed.

Step S2408 will be described below. It is determined in step S2408 whether or not a bit to be embedded can be obtained by equation (3) when a character or character element is translated distance i to the right. If "Yes" in step S2408 (the bit can be obtained), the flow advances to step S2409. If "No" in step S2408 (the bit cannot be obtained), the flow advances to step S2410.

Step S2409 will be described below. In step S2409, the shift width is set to "i", and the shift width calculation process ends. Note that a positive sign of the shift width indicates right translation, and a negative sign indicates left translation.

Step S2410 will be described below. It is determined in step S2410 whether or not a bit to be embedded can be obtained by equation (3) when a character or character element is translated distance i to the left. If "Yes" in step S2410 (the bit can be obtained), the flow advances to step S2411. If "No" in step S2410 (the bit cannot be obtained), the flow advances to step S2412.

Step S2411 will be described below. In step S2411, the shift width is set to "−i", and the shift width calculation process ends.

Step S2412 will be described below. In step S2412, variable i is incremented by 1, and the flow returns to step S2402.

The aforementioned shift width is defined by the direction and distance of translation, and a region in a circumscribing rectangle of a character used to embed 1 bit is translated in practice. By repeating the aforementioned process for the entire input document, additional information Inf1 can be embedded in document data.

With the above method, the second digital watermark can be embedded in document data D1. However, a second digital watermark extraction processor to be described below cannot determine whether or not the second digital watermark is embedded. Hence, in place of embedding additional information Inf1 intact, additional information Inf1' is generated by appending common information before additional information Inf1 is generated, and is embedded as the second digital watermark. Note that the common information is set as fixed information independently of additional information Inf1 or document data D1. For example, a bit sequence of all "0"s may be used as common information. Also, the common information must be shared by the second digital watermark embedding processor, and the second digital watermark extraction processor to be described below.

[Second Digital Watermark Extraction Processor]

A method of extracting a digital watermark embedded by the aforementioned digital watermark embedding processor will be described below. The digital watermark extraction processor (function) which is applied to this embodiment will be described below using FIG. 22.

As shown in FIG. 22, the extraction processor of this embodiment comprises a document image analysis unit 2201 and additional information extraction unit 2202.

Note that the extraction process to be described below may be implemented by software processes. In such case, the aforementioned units should be considered as conceptual functions required for the process.

The function of the document image analysis unit 2201 will be described first. The document image analysis unit 2201 receives document data I4, executes a document data analysis process of input document data I4, and outputs circumscribing rectangle information b2 as the analysis process result. Since the document data analysis process executed by the document image analysis unit 2201 is the same as that executed by document image analysis unit 2101 in FIG. 21, a detailed description thereof will be omitted. Output circumscribing rectangle information b2 is temporarily held by the RAM 305.

The function of the additional information extraction unit 2202 will be described below. The additional information extraction unit 2202 receives document data I4 and circumscribing rectangle information b2 from the RAM 305, extracts additional information Inf3 embedded as a digital watermark from document data I4 using circumscribing rectangle information b2, and outputs extracted additional information Inf3.

The digital watermark extraction process will be described below. The digital watermark extraction process is a process for calculating the space lengths between neighboring circumscribing rectangles on the basis of input circumscribing rectangle information b2, and extracting additional information Inf3 on the basis of the calculation result and predetermined embedding rules. For example, a digital watermark embedded using the second digital watermark embedding processor of this embodiment can be extracted as additional information Inf3 using equation (3) above.

With the above method, a second digital watermark can be extracted from document data I4. However, it is difficult to determine whether or not the extracted additional information is that embedded by the aforementioned second digital watermark embedding processor. Hence, in practice, the aforementioned common information is extracted from the extracted additional information, and if the extracted common information matches that embedded by the second digital watermark embedding processor, it is determined that the extracted additional information is that embedded by the second digital watermark embedding processor. Then, information obtained by removing the common information from the extracted additional information is output as second additional information Inf3. On the other hand, if the extracted common information does not match that embedded by the second digital watermark embedding processor, it is determined that no second additional information is embedded in document data I4. Then, information (e.g., NULL) indicating that "no additional information is embedded" is output as second additional information Inf3.

Note that the first and second digital watermark embedding processors, and the first and second digital watermark extraction processors have been explained. However, the present invention is not limited to these specific processors, and can adopt various other methods, while defining a digital watermark which has relatively weak robustness against attacks as a first digital watermark, and a digital watermark which has relatively strong robustness against attacks as a second digital watermark.

That is, digital watermarks having different robustness levels are set, and embedding results of respective digital watermarks are composited and output. In this case, as additional information of a digital watermark which is required to have highest robustness, data extracted from document data itself is preferably adopted.

Second Embodiment

The first embodiment has examined a case wherein document data to be processed by the verification processor does not rotate with respect to image data output from the signature processor. However, when a document printed out from the signature processor using the printer 317 or the like is input to the verification processor using the scanner 319 or the like, input document data often rotates with respect to image data output from the signature processor. Since it is difficult to execute the identification information extraction process or additional information extraction process using rotated document data, such rotation must be corrected to the same state as image data output from the signature processor. Hence, the second embodiment will explain a verification process for document data input with a rotation.

[Verification Processor]

A verification processor (function) which is applied to this embodiment will be explained below using FIG. 17.

Figure 17:
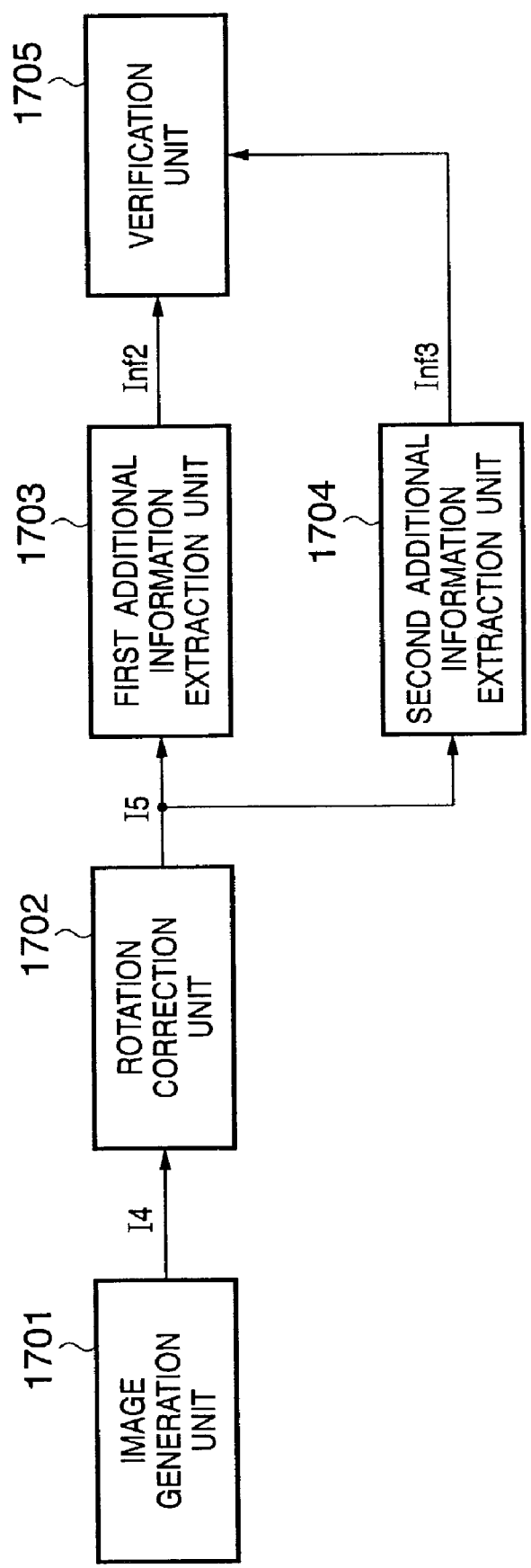
FIG. 17 is a block diagram showing the arrangement of a verification processor in the second embodiment of the present invention.

As shown in FIG. 17, the verification processor of this embodiment comprises an image generation unit 1701, rotation correction unit 1702, identification information extraction unit 1703, additional information extraction unit 1704, and verification unit 1705.

Note that the verification processor shown in FIG. 17 has an arrangement obtained by adding the rotation correction unit 1702 to the verification processor shown in FIG. 2. Hence, the rotation correction unit 1702 alone will be explained. Since the image generation units 201 and 1701, identification information extraction units 202 and 1703, additional information extraction units 203 and 1704, and verification units 204 and 1705 respectively execute the same processes, a detailed description thereof will be omitted.

The function of the rotation correction unit 1702 will be explained below. The rotation correction unit 1702 receives document data I4 generated by the document data generation unit 1701 via the RAM 305, executes a rotation correction process for input document data I4, and outputs image data I5 that has undergone the rotation correction process.

Figure 18:
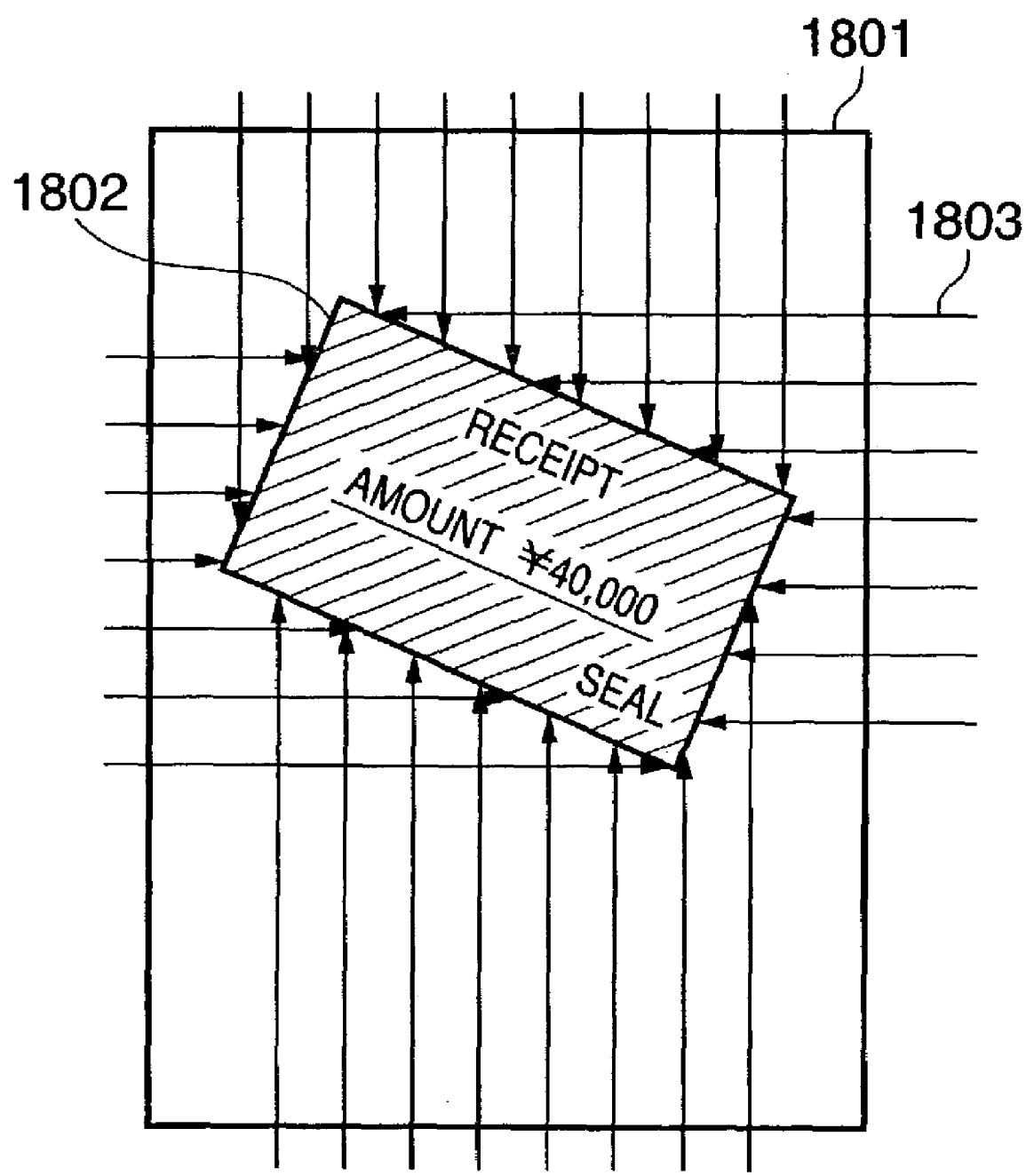
FIG. 18 is a view for explaining rotation correction in the second embodiment.

An example of the rotation correction process will be described in detail below using FIGS. 18 and 19.

Figure 19:
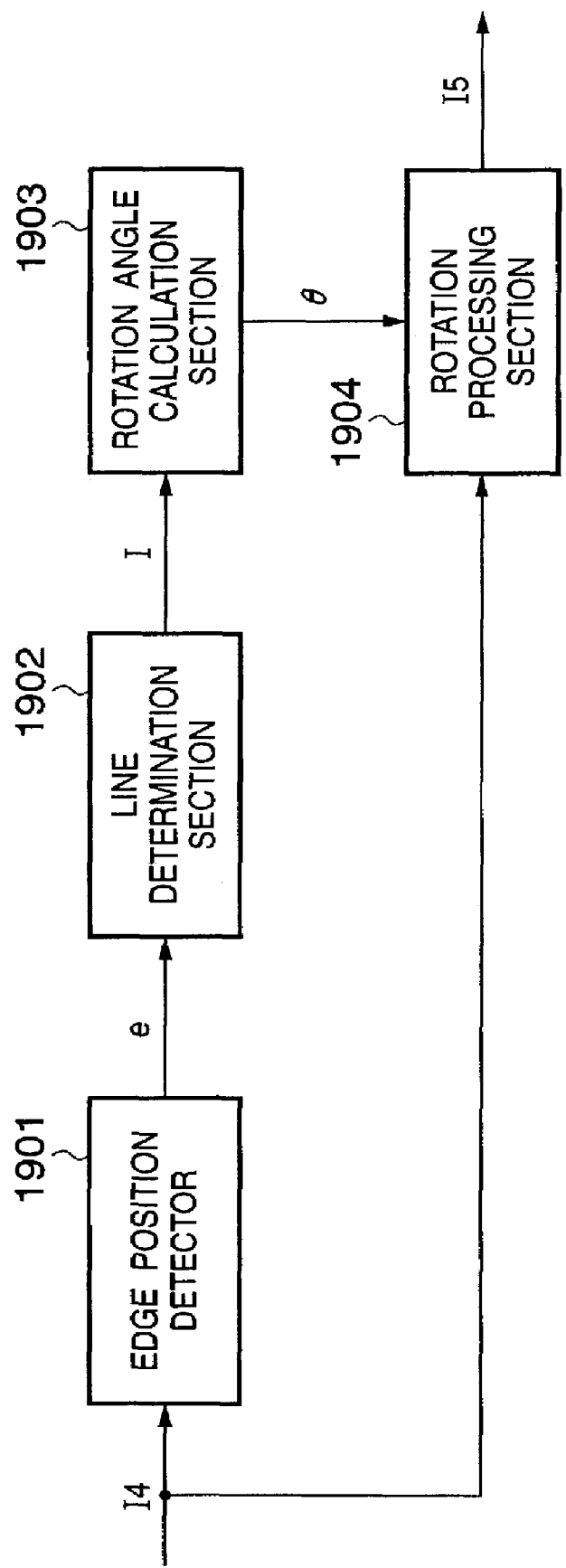
FIG. 19 is a block diagram showing the arrangement of a rotation correction unit in the second embodiment.

As shown in FIG. 19, a rotation correction processor in this embodiment comprises an edge position detector 1901, line determination section 1902, rotation angle calculation section 1903, and rotation processing section 1904.

The function of the edge position detector 1901 will be explained first. The edge position detector 1901 receives document data I4 generated by the document data generation unit 1701, detects edge position e in input document data I4, and outputs detected edge position e.

The edge position detection process will be described below using FIG. 18. Referring to FIG. 18, reference numeral 1801 denotes document data I4 input to the rotation correction processor; and 1802, an image region which includes document data (where a digital watermark is embedded). From each of the four sides of the document data 1801, positions e (triangle marks in FIG. 18) of edges where a change in pixel value (luminance or density) is large are detected in directions perpendicular to the four sides, as indicated by arrows 1803 shown in FIG. 18.

The function of the line determination section 1902 will be described below. The line determination section 1902 receives edge positions e detected by the edge position detector 1901, determines four lines 1 (corresponding to the four sides of the image data 1802) using edge position e, and outputs determined four lines 1.

As examples of a determination method of four lines 1, a method of sorting detected edge positions e into four periods on the basis of maximal and minimal positions on an x-y coordinate system, and determining lines in these periods using least mean square approximation, a method of determining lines using Huff transformation, and the like may be adopted.

Note that an improvement, i.e., exclusion of edges at positions which largely depart from lines, or the like may be adopted to improve the precision of line approximation.

The function of the rotation angle calculation section 1903 will be described below. The rotation angle calculation section 1903 receives four lines 1 determined by the line determination section 1902, calculates rotation angle θ of the image data 1802 using input four lines 1, and outputs calculated rotation angle θ.

As a method of calculating rotation angle θ, an angle one of four lines 1 makes with the vertical or horizontal direction of the image data 1801 is calculated, thereby calculating the rotation angle of the image data 1802 with respect to the image data 1801. In general, when rotation angle θ is calculated by this method, the calculated angle has indefiniteness of θ±90×n (n is an integer). In this embodiment, however, if it is assumed that rotation angle θ is a very small angle, the rotation angle can be calculated by selecting a relatively small angle as rotation angle θ.

The function of the rotation processing section 1904 will be described below. The rotation processing section 1904 receives document data I4 and rotation angle θ, rotates image data I4 through rotation angle θ, clips only the region 1802 within the detected edge positions after rotation, and outputs the clipped region as image data I5.

An example of the rotation correction process in this embodiment has been explained. Note that the present invention is not limited to such specific example, and various other rotation correction processes may be used.

When image data I5 that has undergone the rotation correction process is input to the identification information extraction unit 1703 and additional information extraction unit 1704, the identification information extraction process and additional information extraction process can be normally executed. That is, using the verification processor of this embodiment, even when document data input to the verification processor rotate, a verification process can be normally done.

In general, the user sets a document on the scanner to scan it in either a landscape or portrait position. Hence, even after rotation correction, the corrected image may still have a deviation of 90°. Hence, even when extraction of additional information has failed after the above correction, an extraction process is preferably redone by rotating the input image through 90°.

Third Embodiment

The third embodiment does not have any objects and features which are completely independent from the first or second embodiment, and will explain a case wherein execution of the first embodiment is considered as a principal function (first mode), and another function (second mode) is added.

In the above embodiments (first and second embodiments), additional information is embedded in image data I1 by the first embedding method which has weak robustness against copying, and additional information is embedded in document data D1 by the second embedding method which has strong robustness against copying.

However, the present invention is not limited to such specific embodiments, and may embed additional information Inf1 in image data I1 by both the first embedding method which has weak robustness against copying and the second embedding method which has strong robustness against copying.

The third embodiment is particularly effective when document data D1 has a small number of characters, and it is difficult to embed additional information Inf1.

This embodiment comprises one embedding function (corresponding to selection of the second mode) of "segmenting an image into a plurality of regions, and embedding digital watermarks in respective regions to have different robustness levels". It is most effective to consider the above function as an additional function which is to be executed when the aforementioned principal function (corresponding to selection of the first mode) cannot be executed.

[Signature Processor]

A signature processor (function) which is applied to the third embodiment will be described below using FIG. 26.

Figure 26:
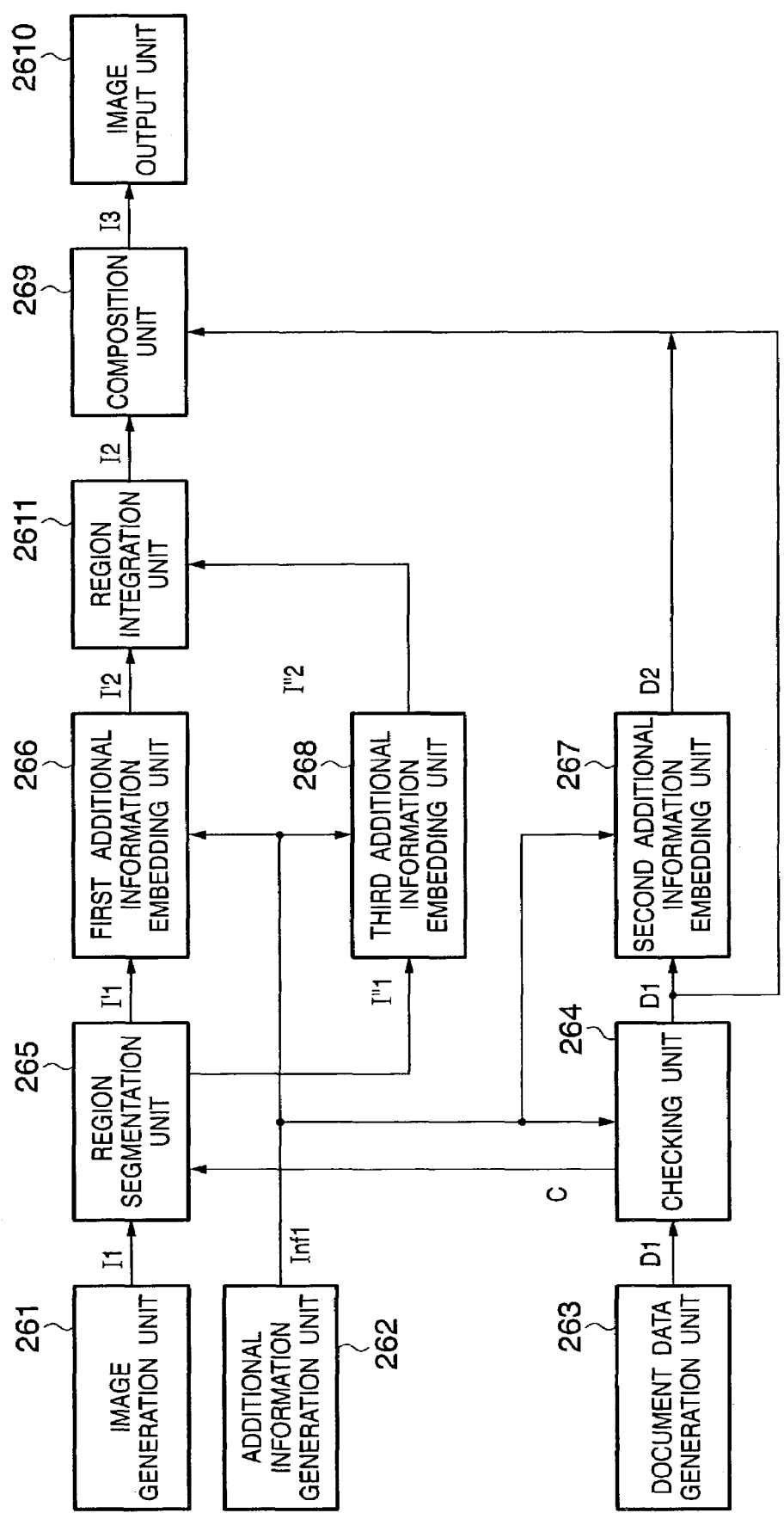
FIG. 26 is a block diagram for explaining the arrangement of a signature processor in the third embodiment of the present invention.

As shown in FIG. 26, the signature processor of the third embodiment comprises an image generation unit 261, additional information generation unit 262, document data generation unit 263, checking unit 264, region segmentation unit 265, first additional information embedding unit 266, second additional information embedding unit 267, third additional information embedding unit 268, composition unit 269, image output unit 2610, and region integration unit 2611.

Note that the signature process to be described below may be implemented by software processes. In such case, the aforementioned units should be considered as conceptual functions required for the process.

Since the image generation unit 261, additional information generation unit 262, document data generation unit 263, first additional information embedding unit 266, second additional information embedding unit 267, composition unit 269, and image output unit 2610 execute the same operations as those in the image generation unit 101, additional information generation unit 102, document data generation unit 103, first additional information embedding unit 104, second additional information embedding unit 105, composition unit 106, and image output unit 107 in FIG. 1, a detailed description thereof will be omitted. In this embodiment, the operations of the checking unit 264, region segmentation unit 265, third additional information embedding unit 268, and region integration unit 2611 will be explained.

The operation of the checking unit 264 will be described below. The checking unit 264 receives document data D1 and additional information Inf1, and checks whether or not additional information Inf1 can be embedded in input document data D1. The checking result is sent to the region segmentation unit using control signal C. Furthermore, if it is determined that additional information Inf1 can be embedded in input document data D1, the unit 264 outputs document data D1 to the subsequent second additional information embedding unit 267; otherwise, it does not output no data to the second additional information embedding unit (or outputs a signal indicating that embedding is impossible or NULL).

In this embodiment, the "case wherein document data D1 is output to the second additional information embedding unit 267" corresponds to selection of the first mode, and the same operation as in the first embodiment is executed. On the other hand, the "case wherein no data is output to the second additional information embedding unit" corresponds to selection of the second mode.

The checking unit 264 can check whether or not additional information Inf1 can be embedded in input document data D1, using the information size and the like of additional information Inf1, and the number of characters, character size, number of lines, language, and font in document data D, combinations of those kinds of information, and the like. Alternatively, the above checking process may be done using only the number of characters, character size, number of lines, language, and font in document data D, combinations of those kinds of information, and the like.

The checking unit 264 may embed additional information Inf1 in document data D1, extract it, and then check if additional information can be embedded using the extracted additional information. Furthermore, the checking unit 264 may simulate assumed attacks, printing/scanning, and-the like by executing various image processes after embedding.

The operation of the region segmentation unit 265 will be described below. The region segmentation unit 265 receives image data I1 and control information C, and determines based on control information C whether or not a region segmentation process is to be executed. If it is determined that the region segmentation process is to be executed, the unit 265 segments image data I1 into region data I'1 and I"1, thus outputting segmented region data I'1 and I"1.

When control information C indicates that "additional information Inf1 can be embedded in document data D1", the region segmentation unit 265 does not execute any region segmentation process, i.e., outputs single region data I'1 alone to the first additional information embedding unit 266 as image data I1 and outputs no data to the third additional information embedding unit 268. This case corresponds to selection of the first mode.

On the other hand, when control information C indicates that "additional information Inf1 cannot be embedded in document data D1", the unit 265 segments image data I1 into regions data I'1 and I"1, which are respectively output to the first and third additional information embedding units 266 and 268. This case corresponds to selection of the second mode.

An example of the region segmentation process in the region segmentation unit 265 will be explained below using FIGS. 27A to 27D. FIGS. 27A to 27D show examples of region data I'1 (indicated by meshing in FIGS. 27A to 27D) and region data I"1 (indicated by hatching in FIGS. 27A to 27D) after the region segmentation process in this embodiment.

Figure 27A:
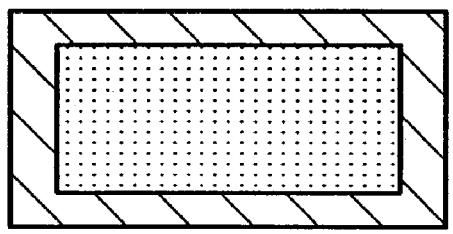
FIGS. 27A to 27D are views for explaining regions in the third embodiment.
Figure 27B:
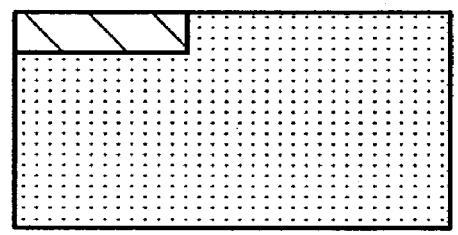
Figure 27C:
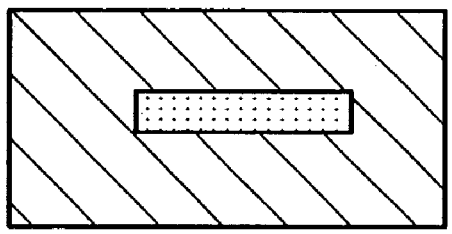
Figure 27D:
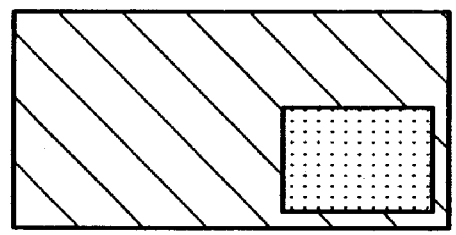

FIG. 27A shows an example wherein the edge portion of image data I1 is determined to be region data I"1, and the remaining portion is determined to be region data I'1. FIG. 27B shows an example wherein the upper left stripe-shaped region of image data IT is determined to be region data I"1, and the remaining portion is determined to be region data I'1. Furthermore, FIG. 27C shows an example wherein a region on image data I1, which corresponds to a region where a specific character string such as an amount or the like in document data D1 is recorded, is determined to be region data I'1, and the remaining portion is determined to be region data I"1. Moreover, FIG. 27D shows an example wherein a region on image data I1, which corresponds to a region where a photo or the like in document data D1 is recorded, is determined to be region data I'1, and the remaining portion is determined to be region data I"1.

In this embodiment, the region segmentation unit 265 segments image data into spatial regions. However, the present invention is not limited to such specific process, and the unit 265 may segment image data into frequency regions. For example, after image data I1 undergoes frequency transformation, low-frequency components may be determined to be region data I'1, and high-frequency components may be determined to be region data I"1.

In this embodiment, image data I1 is segmented into two regions. However, the present invention is not limited to such specific value, and image data I1 can be segmented into three or more regions. In this case, at least one region can be determined to be region data I'1, and at least another region can be determined to be region data I"1.

The third additional information embedding unit 268 will be described below. The third additional information embedding unit 268 receives region data I"1 and additional information Inf1, embeds input additional information Inf1 in region data I"1, and outputs region data I"2 embedded with additional information Inf1.

A third additional information embedding process to be implemented by the third additional information embedding unit 368 visibly or invisibly embeds additional information by a method which is robust against copying.

For example, the digital watermark embedding process explained in the first embodiment can be used as the third additional information embedding process. In this case, by increasing value a which can set the strength, a digital watermark with a higher strength may be embedded.

When text of document data D1 has a region which includes a photo, table, or the like other than text, or when document data D1 has a text region indicating important contents such as an amount or the like, the region segmentation unit 265 executes the region segmentation process to determine these regions to be region data I'1, as shown in FIGS. 27C and 27D, so as not to impair the legibility of these regions. With this process, a digital watermark (which has no robustness against copying) is embedded in region data I'1, and image quality deterioration of the corresponding region can be consequently suppressed.

In the first embodiment, additional information is embedded invisibly or visibly imperceptibly by appropriately adjusting value a. When extremely large value a is set, additional information can be visibly embedded.

In this case, the region segmentation unit 265 executes the region segmentation process to determine the image edge portion to be region data I"1, as shown in FIG. 27A, so as not to impair the legibility of text in document data D1.

Furthermore, the third additional information embedding process may visibly embed additional information using a one- or two-dimensional barcode.

In this case, the region segmentation unit 265 executes the region segmentation process to determine a region where a one- or two-dimensional barcode is to be appended to be region data I"1, as shown in FIG. 27B.

The region integration unit 2611 will be described below. The region integration unit 2611 receives region data I'2 and I"2 embedded with additional information Inf1, integrates the input two region data, and outputs integrated image data I2. The region integration process in the region integration unit 2611 lays out respective input regions at positions before region segmentation in the region segmentation unit 265.

The signature processor (function) applied to this embodiment has been explained.

Figure 28:
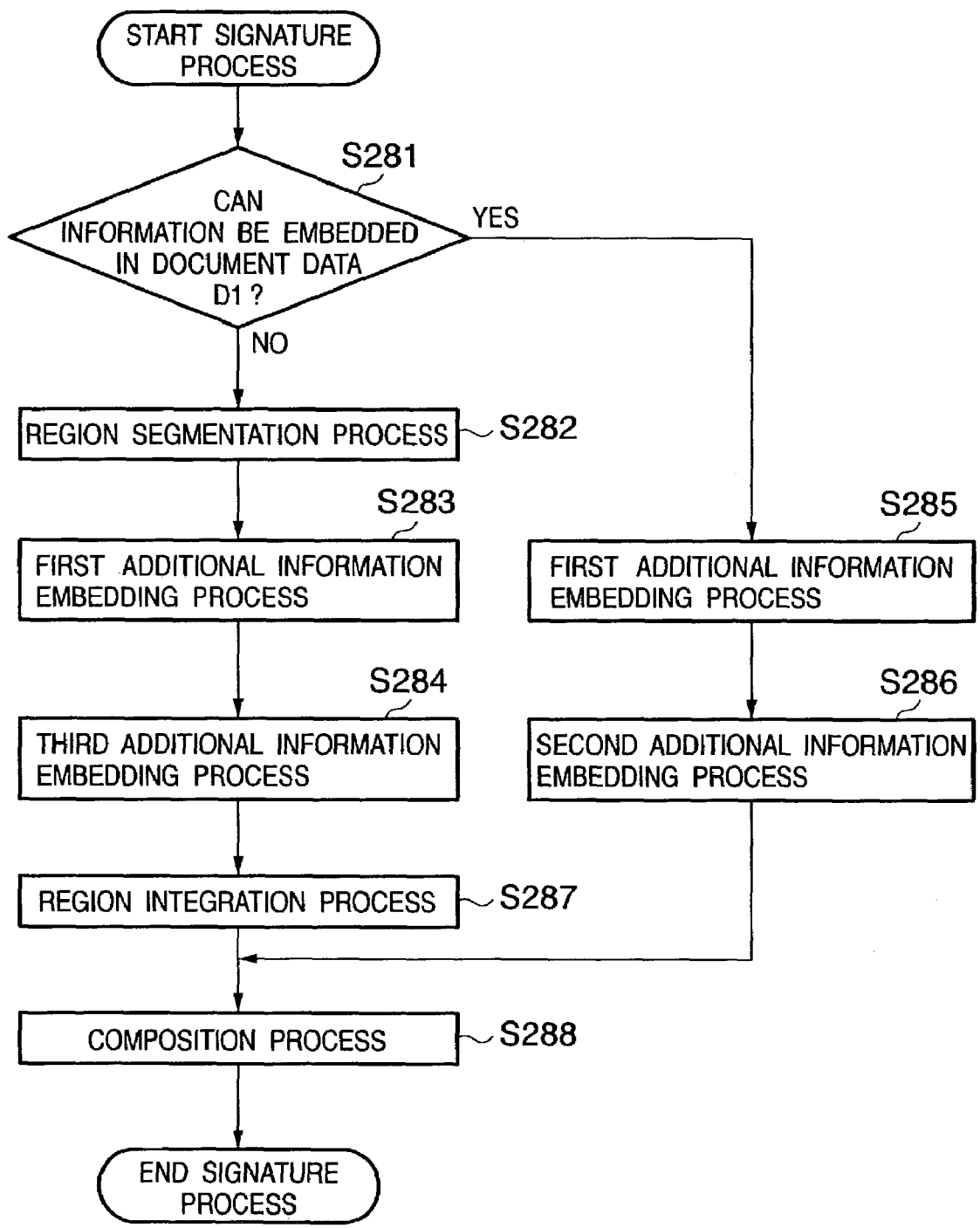
FIG. 28 is a flow chart of a signature process in the third embodiment.

The flow of the signature process in this embodiment will be described below using FIG. 28.

It is checked in step S281 using document data D1 generated by the document data generation unit 263 and additional information Inf1 generated by additional information generation unit 262 if additional information Inf1 can be embedded in document data D1 (checking unit 264). If additional information cannot be embedded, the flow advances to step S282; otherwise, the flow advances to step S285.

In step S282, the region segmentation process for segmenting image data I1 generated by the image generation unit 261 into region data I'1 and I"1 is executed (region segmentation unit 265) In step S263, additional information Inf1 is embedded in region data I'1 by the first additional information embedding process (first additional information embedding unit 266). In step S264, additional information Inf1 is embedded in region data I"1 by the third additional information embedding process (third additional information embedding unit 268). Furthermore, region data I'2 and I"2 embedded with the additional information Inf1 are integrated into one image data I2 in step S287 (region integration unit 2611).

On the other hand, in step S285 additional information Inf1 is embedded in image data I1 by the first additional information embedding process (first additional information embedding unit 266). In step S286, additional information Inf1 is embedded in document data D1 by the second additional information embedding process (second additional information embedding unit 267).

In step S288, image data I2 embedded with additional information Inf1 and document data D2 or D1 (in which no additional information Inf1 is embedded) is composited into a single image to generate image data I3 (composition unit 269).

Image data 13 generated in this way is output from the image output unit 2610.

In this embodiment, whether additional information Inf1 is strongly embedded in document data D1 or region data I"1 is selected on the basis of the checking result of the checking unit 264 and in accordance with document data D1 and additional information Inf1. However, the present invention is not limited to such specific embodiment, and additional information Inf1 can always be embedded in region data I"1.

[Verification Processor]

A verification processor (function) which is applied to the third embodiment will be described below using FIG. 29.

Figure 29:
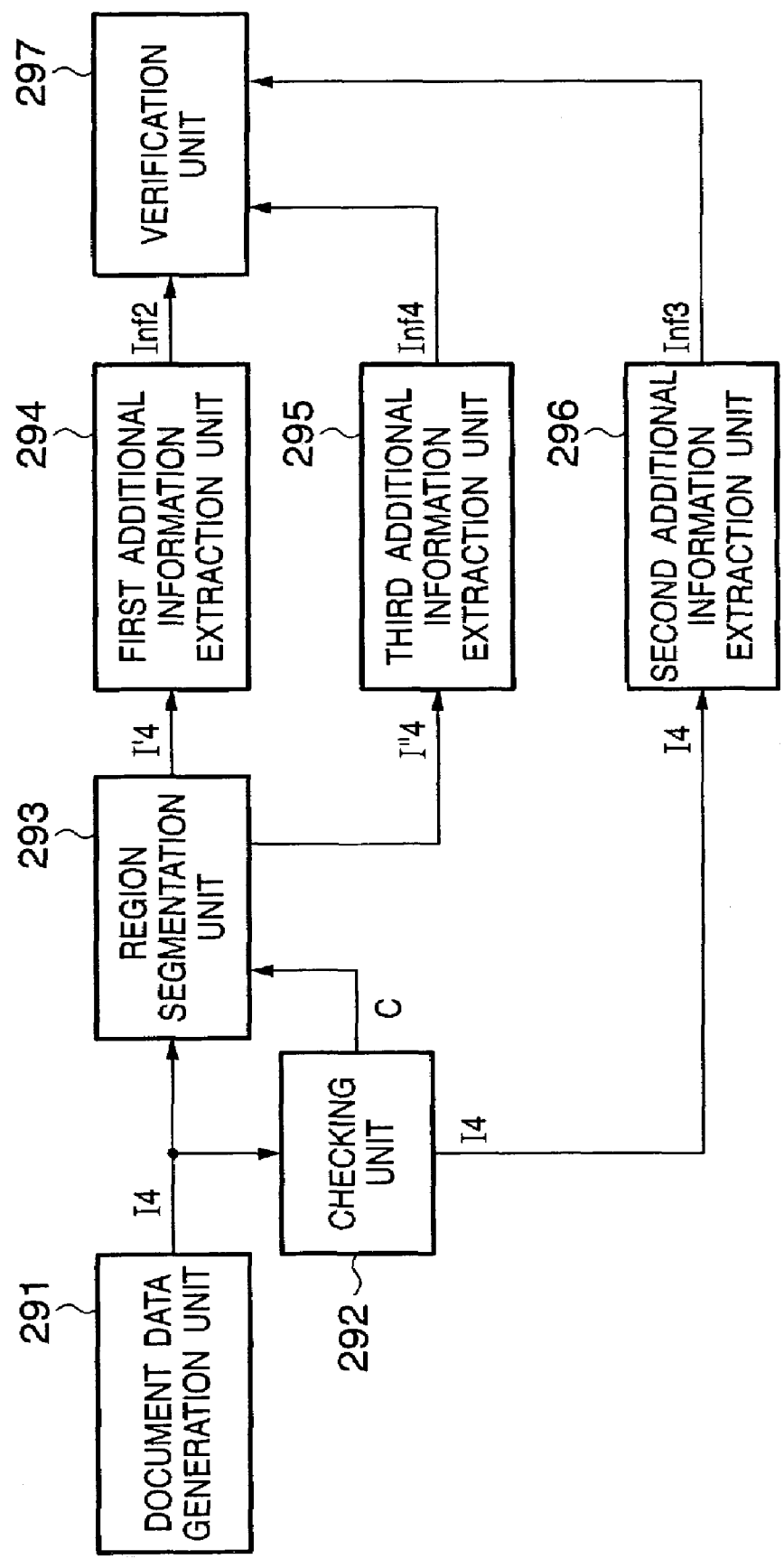
FIG. 29 is a block diagram for explaining the arrangement of a verification processor in the third embodiment.

As shown in FIG. 29, the verification processor of the third embodiment comprises a document data generation unit 291, checking unit 292, region segmentation unit 293, first additional information extraction unit 294, third additional information extraction unit 295, second additional information extraction unit 296, and verification unit 297.

Note that the verification process to be described below may be implemented by software processes. In such case, the aforementioned units should be considered as conceptual functions required for the process.

Since the document data generation unit 291, first and second additional information extraction units 294 and 296, and verification unit 297 execute the same operations as those in the document data generation unit 201, first additional information extraction unit 202, second additional information extraction unit 203, and verification unit 204 shown in FIG. 2, a detailed description thereof will be omitted. Also, since the region segmentation unit 293 executes the same operation as in the region segmentation unit 265 in FIG. 26, a detailed description thereof will be omitted. The operations of the checking unit 292 and third additional information extraction unit will be explained below.

The checking unit 292 will be explained first. The checking unit 292 receives document data I4, and checks if additional information is embedded in text data of document data 14 (by the second additional information embedding process).

Note that the text data indicates especially a character portion in document data. Document data I4 is obtained by inputting image data I3, which is generated by compositing image data I2 (background data) and document data D2 (text data) mentioned above. Hence, the checking unit 292 extracts text data alone corresponding to document data D2 from document data I4, and checks if additional information is embedded in the extracted text data.

The checking result is sent to the region segmentation unit 293 using control signal C. Furthermore, if it is determined that additional information is embedded in text data, the unit 292 outputs document data T4 to the subsequent second additional information extraction unit 296; otherwise, the unit 292 does not send any data to the second additional information extraction unit 296.

Unlike in the checking unit 264 in the aforementioned signature process, since the checking unit 292 in this embodiment does not often receive additional information Inf1, the unit 292 checks whether or not additional information is embedded in document data, using the information size of additional information Inf1, and the number of characters, character size, number of lines, language, and font in document data I4, combinations of those kinds of information, and the like. Alternatively, the above checking process may be done using only the number of characters, character size, number of lines, language, and font in document data I4, combinations of those kinds of information, and the like. Or the checking unit 292 may attempt to extract additional information in practice using the function of the subsequent second additional information extraction unit 296, and may determine in accordance with the extracted result.

The third additional information extraction unit will be described below. The third additional information extraction unit receives region data I"4, extracts additional information Inf4 from region data I"4, and outputs extracted additional information Inf4. When additional information Inf4 is embedded by, e.g., digital watermarking, a digital watermark extraction process may be executed as in the first additional information extraction unit 294. When additional information Inf1 is embedded as a barcode or the like, a barcode read process may be executed.

The verification processor (function) of this embodiment has been explained.

Figure 30:
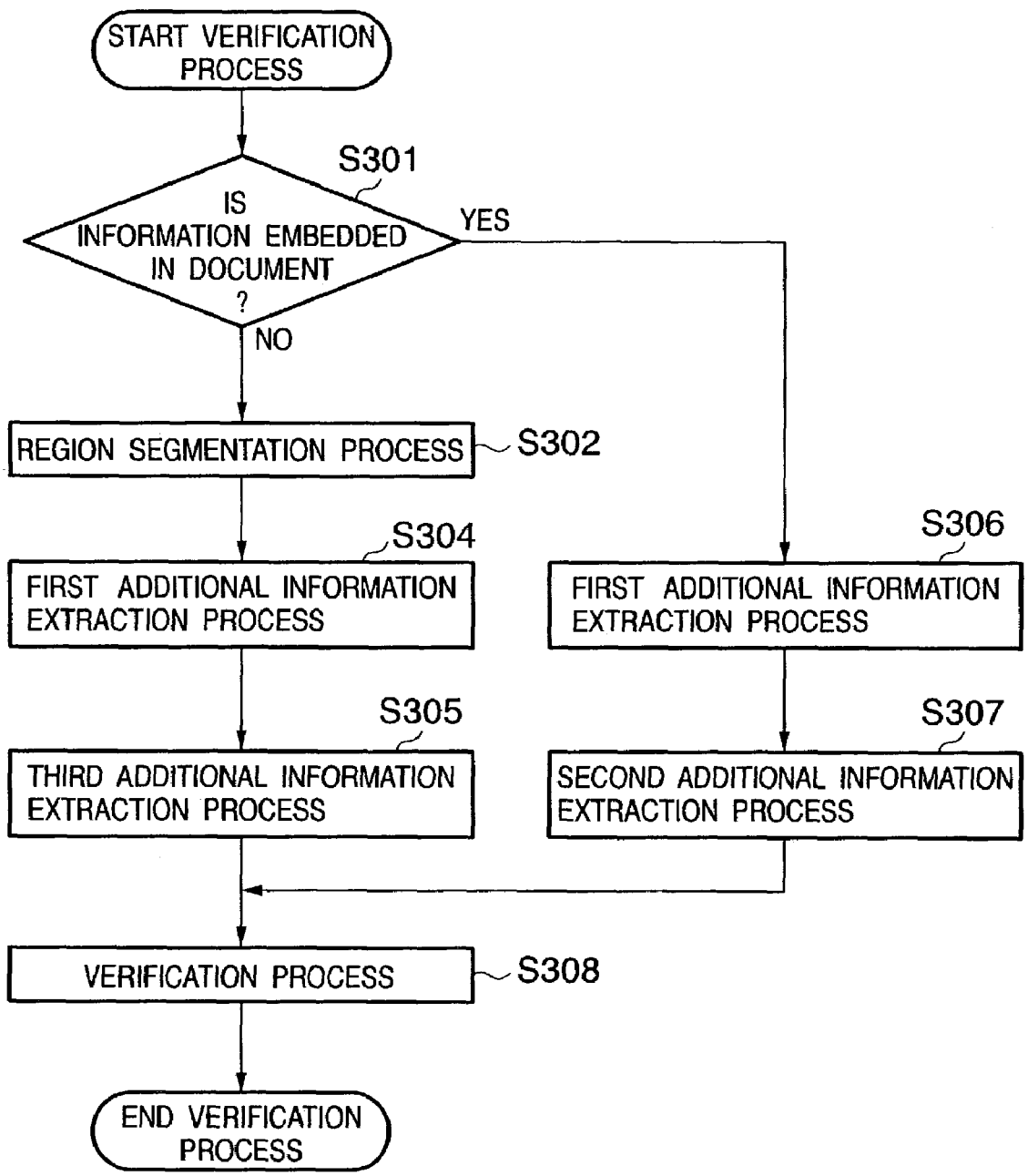
FIG. 30 is a flow chart of a verification process in the third embodiment.

The flow of the verification process in the third embodiment will be described below using FIG. 30.

It is determined in step S301 whether or not additional information Inf1 is embedded in text data in document data I4 generated by the document data generation unit 291 (checking unit 292). If additional information is embedded, the flow advances to step S302; otherwise, the flow advances to step S306.

In step S302, the region segmentation process for segmenting document data 14 into region data I'4 and I"4 is executed (region segmentation unit 293). In step S304, additional information is extracted from region data I'4 by the first additional information extraction process (first additional information extraction unit 294). Furthermore, in step S305 additional information is extracted from region data I"4 by the third additional information extraction process (third additional information extraction unit 295).

On the other hand, in step S306 additional information is extracted from document data I4 by the first additional information extraction process (first additional information extraction unit 294). Furthermore, in step S307 additional information is extracted from document data I4 by the second additional information extraction process (second additional information extraction unit 296).

In step S308, a verification process is executed by comparing extracted additional information Inf2 with additional information Inf3 or Inf4. That is, if these two pieces of information match, it is determined that document data has not been tampered with; otherwise, it is determined that document data has been tampered with.

As described above, according to the third embodiment, even when it is difficult to embed additional information in document data D1 upon executing the signature process, the signature process can be done. Furthermore, whether or not document data D1 has been tampered with after the signature process can be verified.

Fourth Embodiment

In the first embodiment, the verification process executes both the first and second additional information extraction processes, and whether or not document data I4 has been tampered with is determined by comparing additional information Inf2 and additional information Inf3, which are extracted by these extraction processes.

The fourth embodiment will explain a method of executing the verification process in the first embodiment more efficiently. Since the verification processor (function) of this embodiment has the same arrangement as that in the first embodiment shown in FIG. 2, a description thereof will be omitted. In this embodiment, the flow of the process of the verification processor with the arrangement shown in FIG. 2 will be explained.

Figure 31:
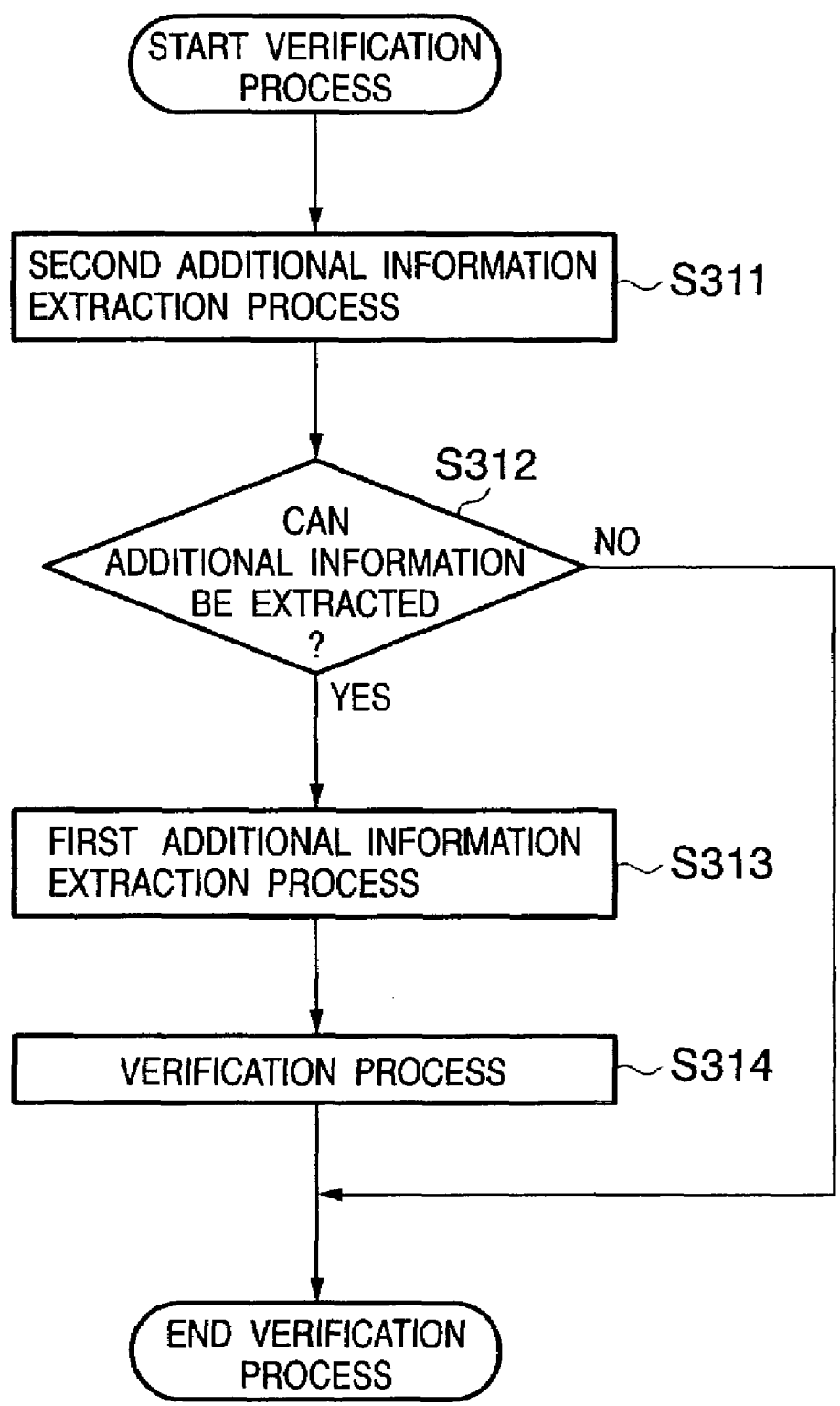
FIG. 31 is a flow chart of a verification process in the fourth embodiment of the present invention.

FIG. 31 is a flow chart showing the verification process of this embodiment.

In step S311, document data I4 generated by the document data generation unit 201 undergoes a second additional information extraction process (second additional information extraction unit 203). It is checked in step S312 if additional information Inf3 is extracted. If additional information Inf3 is extracted, the flow advances to step S313; otherwise, the verification process ends.

In step S313, document data I4 undergoes a first additional information extraction process (first additional information extraction unit 202). It is determined using additional information Inf2 extracted by the first additional information extraction process, and additional information Inf3 extracted by the second additional information extraction process whether or not document data I4 has been tampered with (verification unit 204).

The flow of the verification process in the fourth embodiment has been explained.

In the fourth embodiment, the first additional information embedding process weakly embeds additional information to have no robustness against copying, while the second additional information embedding process strongly embeds additional information to have robustness against copying. Hence, when the second additional information extraction process cannot extract any additional information, it is determined that no first additional information is embedded, and the first additional information extraction process S313 and verification process S314 are skipped.

As described above, according to the fourth embodiment, since the first additional information extraction process S313 and verification process S314 are executed only when they are needed, the verification process can be efficiently executed.

Fifth Embodiment

In the third embodiment, both the first and second additional information extraction processes or both the first and third additional information extraction processes are executed in the verification process, and whether or not document data I4 has been tampered with is determined by comparing additional information Inf2 and additional information Inf3 or Inf4, which are extracted by these extraction processes.

The fifth embodiment will explain a method of executing the verification process in the third embodiment more efficiently. Since the verification processor (function) of this embodiment has the same arrangement as that in the third embodiment shown in FIG. 29, a description thereof will be omitted. In this embodiment, the flow of the process of the verification processor with the arrangement shown in FIG. 29 will be explained.

Figure 32:
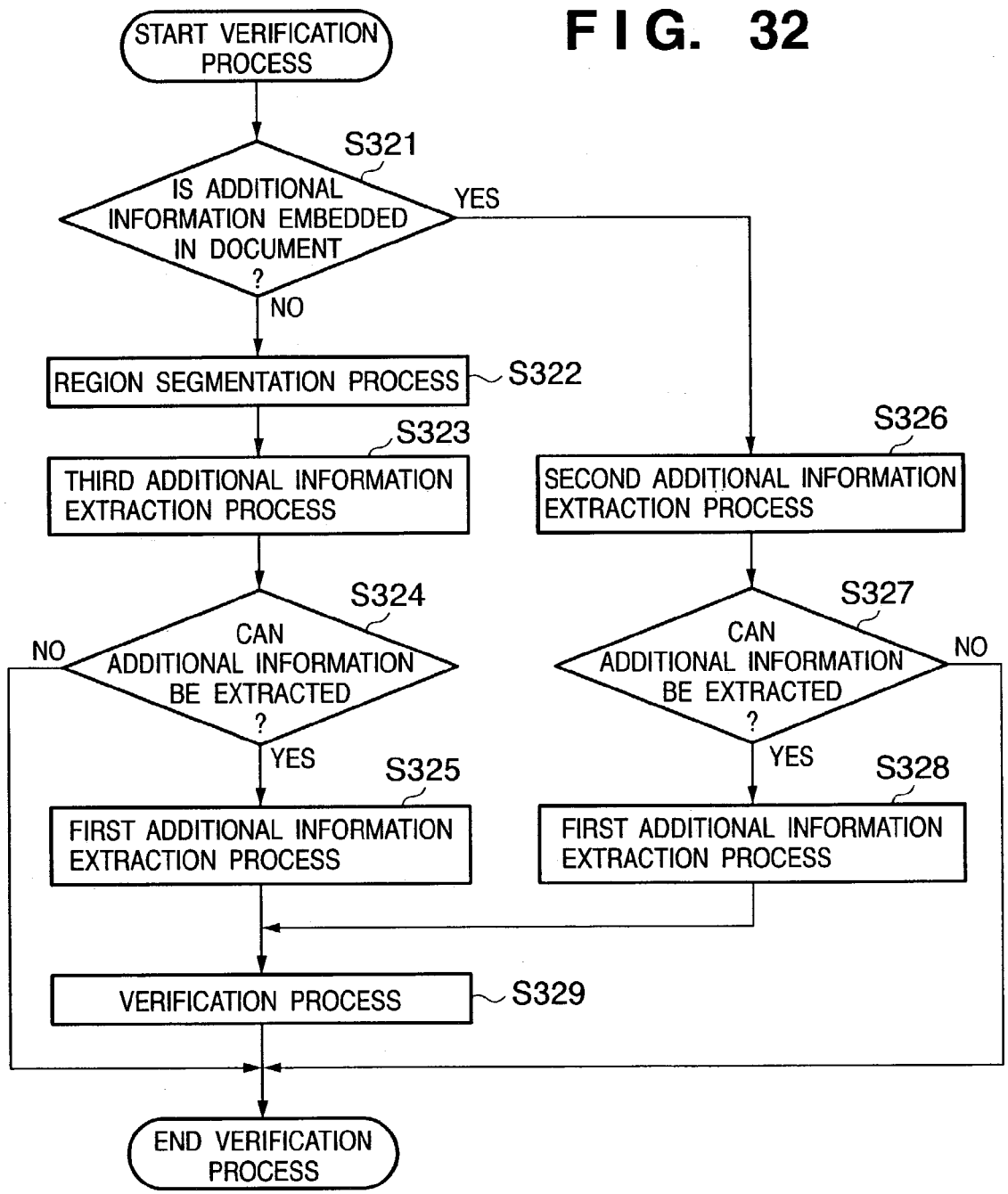
FIG. 32 is a flow chart of a verification process in the fifth embodiment of the present invention.

FIG. 32 is a flow chart showing the verification process of the fifth embodiment.

It is checked in step S321 if additional information is embedded in text data in document data I4 generated by the document data generation unit 291 (checking unit 292). If it is determined that no additional information is embedded in text data, the flow advances to step S322; otherwise, the flow advances to step S326.

In step S322, document data I4 undergoes a region segmentation process (region segmentation unit 293). In step S323, additional information Inf4 is extracted from region data I"4 (third additional information extraction unit). It is then checked in step S324 if additional information Inf4 is extracted. If additional information Inf4 is extracted, the flow advances to step S325; otherwise, the verification process ends. In step S325, additional information Inf2 is extracted from region data I'4 (first additional information extraction unit 294). Instep S329, the verification process is executed using the extracted additional information Inf2 and additional information Inf4 (verification unit 297).

On the other hand, additional information Inf3 is extracted from document data I4 in step S326 (second additional information extraction unit 296), it is checked in step S327 if additional information Inf3 is extracted. If additional information Inf3 is extracted, the flow advances to step S328; otherwise, the verification process ends. In step S328, additional information Inf2 is extracted from document data I4 (first additional information extraction unit 294). In step S329, the verification process is executed using the extracted additional information Inf2 and additional information Inf3 (verification unit 297).

The flow of the verification process in this embodiment has been explained.

In the fifth embodiment, the first additional information embedding process weakly embeds additional information to have no robustness against copying, while the second and third additional information embedding processes strongly embed additional information to have robustness against copying. Hence, when the second or third additional information extraction process cannot extract any additional information, it is determined that no first additional information is embedded, and the first additional information extraction process S325 or S328 and verification process S329 are skipped.

As described above, according to the fifth embodiment, since the first additional information extraction process S325 or S328 and verification process S329 are executed only when they are needed, the verification process can be efficiently executed.

<Description of Application Example>

Various application examples of the aforementioned embodiments are available. In this case, an example applied to a printer driver that runs on a personal computer will be explained.

Normally, a printer driver receives data to be printed from a word processing application, converts the received data into a description that a target printer can interpret, and outputs the converted data. Therefore, upon issuing a print instruction on the application, an image serving as a background is selected from a plurality of images which are registered in advance.

Upon printing a document, since data that contains character codes is passed to a printer driver, additional information to be embedded can be extracted by extracting a character string from that data. That is, in this case, the need for the aforementioned character recognition can be obviated. That additional information is embedded in the background image designated by the application to have relatively low robustness, and is embedded in data to be printed (document data in the above embodiment) passed from the application to have high robustness (by adjusting the inter-character spaces) Data obtained by compositing these embedding results is converted into data suited to a printer, and the converted data is output via an OS.

As described above, according to this embodiment, when document data undergoes embedding process having different robustness levels, the robustness level at which verification has succeeded can be determined upon verification. Hence, whether or not document data is an original or copy can also be verified.

Note that the additional information embedding and extraction methods explained in the above embodiments are merely examples, and other methods maybe used. Hence, the above embodiments do not limit the present invention.

As can be seen from the description of the above embodiments, principal part of the present invention can be provided as an application that runs on a personal computer. Therefore, the scope of the present invention includes a computer program. Furthermore, the computer program is normally stored in a portable computer-readable storage medium such as a floppy (R) disk, CD-ROM, or the like, and is ready to run when the medium is set in the computer to copy or install the program. Therefore, the scope of the present invention also includes the computer-readable storage medium.

As described above, a plurality of different embedding processes are done, and the extraction results of information embedded by those processes are verified, thus determining a relationship with respect to a master. Hence, whether target document data corresponds to a master (original) or copy can be verified.

The present invention is not limited to the above embodiments and various changes and modifications can be made within the spirit and scope of the present invention. Therefore, to apprise the public of the scope of the present invention, the following claims are made.

What is claimed is:

1. An information processing method for embedding additional information in document data, comprising:
   a document data input step of inputting document data that includes a character string;
   an additional information input step of inputting additional information;
   an image data input step of inputting image data as a background image;
   a first embedding step of embedding the additional information in the input background image data, using a first digital watermark method and a parameter defining a robustness, wherein the first digital watermark method embeds information in an image by changing a pixel value using the parameter defining the robustness, and wherein the parameter is determined so that, in a case where an original document, in which information has been embedded using the first digital watermark method, is copied by a copying machine, the embedded information cannot be detected in the copied document output from the copying machine;
   a second embedding step of embedding the additional information in the input document data, using a second digital watermark method, wherein the second digital watermark method embeds information in an image by changing a distance between characters in the image so that, in a case where an original document, in which information has been embedded using the second digital watermark method, is copied by a copying machine, the embedded information can be detected in the copied document output from the copying machine;
   a composition step of compositing the document data in which the additional information has been embedded in the second embedding step, as a foreground image, and the background image in which the additional information has been embedded in the first embedding step; and
   an output step of outputting the document data composed with the image data in the composition step.

2. The method according to claim 1, wherein the second digital watermark method embeds information by adjusting a distance between circumscribing rectangles of neighboring character images included in the document data, and repeating the adjustment for respective character images.

3. An information processing method for verifying whether or not document data matches an original, comprising:
   an input step of inputting document data that includes a character string;
   a first extraction step of extracting, from the document data input in the input step, first additional information embedded using a first digital watermark method, wherein the first digital watermark embedding method embeds information in an image using a parameter defining a robustness, and wherein the parameter is determined so that, in a case where an original document, in which information has been embedded using the first digital watermark method, is copied by a copying machine, the embedded information cannot be detected in the copied document output from the copying machine;
   a second extraction step of extracting, from the document data input in the input step, second additional information embedded using a second digital watermark method, wherein the second digital watermark method embeds information in an image by changing a distance between characters in the image so that, in a case where an original document, in which information has been embedded using the second digital watermark method, is copied by a copying machine, the embedded information can be detected in the copied document output from the copying machine; and
   a determination step of determining that verification is impossible in a case where the second additional information cannot be extracted, determining that the inputted document data corresponds to a copy in a case where the second additional information can be extracted and the first additional information cannot be extracted, or where the first and second additional information can be extracted but do not match, and otherwise determining that the input document data corresponds to the original.

4. An information processing apparatus for embedding additional information in document data, comprising:
   document data input means for inputting document data that includes a character string;
   additional information input means for inputting additional information;
   image data input means for inputting image data as a background image;
   first embedding means for embedding the additional information in the input background image data, using a first digital watermark method and a parameter defining a robustness, wherein the first digital watermark method embeds information in an image by changing a pixel value using the parameter defining the robustness, and wherein the parameter is determined so that, in a case where an original document, in which information has been embedded using the first digital watermark method, is copied by a copying machine, the embedded information cannot be detected in the copied document output from the copying machine;
   second embedding means for embedding the additional information in the input document data, using a second digital watermark method, wherein the second digital watermark method being of embeds information in an image by changing a distance between characters in the image so that, in a case where an original document, in which information has been embedded using the second digital watermark method, is copied by a copying machine, the embedded information can be detected in the copied document output from the copying machine;
   composition means for compositing the document data in which the additional information has been embedded in the second embedding means as a foreground image, and the background image data in which the additional information has been embedded by the first embedding means; and output means for outputting the document data composed with the background image data by the composition means.

5. A computer program, embodied in a computer-readable medium, comprising codes for controlling an apparatus to function as an information processing apparatus for embedding additional information in document data, said program controlling the apparatus to function as:

document data input means for inputting document data that includes a character string;

additional information input means for inputting additional information;

image data input means for inputting image data as a background image;

first embedding means for embedding the additional information in the input background image data, using a first digital watermark method and a parameter defining a robustness, wherein the first digital watermark method embeds information in an image by changing a pixel value using the parameter defining the robustness, and wherein the parameter is determined so that, in a case where an original document, in which information has been embedded using the first digital watermark method, is copied by a copying machine, the embedded information cannot be detected in the copied document output from the copying machine;

second embedding means for embedding the additional information in the input document data, using a second digital watermark method, wherein the second digital watermark method embeds information in an image by changing a distance between characters in the image so that, in a case where an original document, in which information has been embedded using the second digital watermark method, is copied by a copying machine, the embedded information can be detected in the copied document output from the copying machine;

composition means for compositing the document data in which the additional information has been embedded in the second embedding means as a foreground image, and the background image data in which the additional information has been embedded by the first embedding means; and output means for outputting the document data composed with the background image data by the composition means.

6. An information processing apparatus for verifying whether or not document data matches an original, comprising:

input means for inputting document data that includes a character string;

first extraction means for extracting, from the document data input by the input means, first additional information embedded using a first digital watermark method, wherein the first digital watermark method embeds information in an image using a parameter defining a robustness, and wherein the parameter is determined so that, in a case where an original document, in which information has been embedded using the first digital watermark method, is copied by a copying machine, the embedded information cannot be detected in the copied document output from the copying machine;

second extraction means for extracting, from the document data input by the input means, second additional information embedded using a second digital watermark method, wherein the second digital watermark method embeds information in an image by changing a distance between characters in the image so that, in a case where an original document, in which information has been embedded using the second digital watermark method, is copied by a copying machine, the embedded information can be detected in the copied document output from the copying machine; and determination means for determining that verification is impossible in a case where the second additional information cannot be extracted, determining that the inputted document data corresponds to a copy in a case where the second additional information can be extracted and the first additional information cannot be extracted, or where the first and second additional information can be extracted but do not match, and otherwise determining that the input document data corresponds to the original.

7. A computer program, embodied in a computer-readable medium, having codes for controlling an apparatus to function as an information processing apparatus for verifying whether or not document data matches an original, said program controlling the apparatus to function as:

input means for inputting document data that includes a character string;

first extraction means for extracting, from the document data input by the input means, first additional information embedded using a first digital watermark method, wherein the first digital watermark method embeds information in an image using a parameter defining a robustness, and wherein the parameter is determined so that, in a case where an original document, in which information has been embedded using the first digital watermark method, is copied by a copying machine, the embedded information cannot be detected in the copied document output from the copying machine;

second extraction means for extracting, from the document data input by the input means, second additional information embedded using a second digital watermark method, wherein the second digital watermark method embeds information in an image by changing a distance between characters in the image so that, in a case where an original document, in which information has been embedded using the second digital watermark method, is copied by a copying machine, the embedded information can be detected in the copied document output from the copying machine; and determination means for determining that verification is impossible in a case where the second additional information cannot be extracted, determining that the inputted document data corresponds to a copy in a case where the second additional information can be extracted and the first additional information cannot be extracted, or where the first and second additional information can be extracted but do not match, and otherwise determining that the input document data corresponds to the original.

* * * * *

UNITED STATES PATENT AND TRADEMARK OFFICE
CERTIFICATE OF CORRECTION

PATENT NO. : 7,287,284 B2
APPLICATION NO. : 10/419840
DATED : October 23, 2007
INVENTOR(S) : Junichi Hayashi It is certified that error appears in the above-identified patent and that said Letters Patent is hereby corrected as shown below:

On the Title Page Item -76- "Junichi Hayashi, c/o Canon Kabushiki Kaisha, 3-30-2, Shimomaruko, Ohta-ku, Tokyo (JP)" should read --Junichi Hayashi, Kanagawa (JP)--.

Insert Item --(73) Assignee: Canon Kabushiki Kaisha, Tokyo (JP)--.

Insert Item --(74) Attorney, Agent or Firm—Fitzpatrick, Cella, Harper & Scinto--.

Col. 1, line 17, "any one" should read --anyone--.

Col. 3, line 2, "processor" should read --process--.
line 62, "stores" should read --store--.

Col. 5, line 48, "additional-information" should read --additional information--.

Col. 6, line 26, "document data D2," should read --document data D2--.

Col. 7, line 48, "result" should read --a result--.
line 63, "image data 14" should read --image data I4--.

Col. 8, line 32, "the." should read --the--.

Col. 11, line 14, "pixel" should read --pixels--.

Col. 13, line 30, "The function" should read --¶The function--.

Col. 14, line 8, "consists" should read --consist--.

Col. 15, line 20, "patterns w," should read --pattern w,--.

Col. 16, line 18, "will-be," should read --will be--.
line 26, "w'n" should read --w'$_n$--.

Col. 17, line 6, "values are obtained." should read --value is obtained.--.

Col. 18, line 30, "characters" should read --character--.

Col. 22, line 61, "image data IS" should read --image data I5--.

UNITED STATES PATENT AND TRADEMARK OFFICE
CERTIFICATE OF CORRECTION

PATENT NO. : 7,287,284 B2
APPLICATION NO. : 10/419840
DATED : October 23, 2007
INVENTOR(S) : Junichi Hayashi It is certified that error appears in the above-identified patent and that said Letters Patent is hereby corrected as shown below:

| | |
|---|---|
| Col. 24, line 17, | "no" should read --any--. |
| Col. 25, line 12, | "image data IT" should read --image data I1--. |
| Col. 26, line 36, | "unit 265)" should read --unit 265).--. |
| line 58, | "Image data 13" should read --Image data I3--. |
| Col. 27, line 43, | "document data T4" should read --document data I4--. |
| Col. 28, line 18, | "document data 14" should read --document data I4--. |
| Col. 29, line 4, | "document data 14" should read --document data I4--. |
| line 65, | "Instep S329," should read --In step S329,--. |
| Col. 30, line 3, | "unit 296), it" should read --unit 296). It--. |
| Col. 32, line 59, | "being of" should be deleted. |

Signed and Sealed this

Twenty-fourth Day of June, 2008

JON W. DUDAS
*Director of the United States Patent and Trademark Office*